(12) United States Patent
Umeda et al.

(10) Patent No.: US 12,483,077 B2
(45) Date of Patent: Nov. 25, 2025

(54) SPLIT-TYPE LAMINATED IRON CORE AND METHOD FOR MANUFACTURING SPLIT-TYPE LAMINATED IRON CORE

(71) Applicant: MITSUI HIGH-TEC, INC., Fukuoka (JP)

(72) Inventors: Kazuhiko Umeda, Fukuoka (JP); Hirokazu Arakawa, Fukuoka (JP); Daisuke Komiya, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 247 days.

(21) Appl. No.: 18/033,654

(22) PCT Filed: Sep. 8, 2021

(86) PCT No.: PCT/JP2021/033049
§ 371 (c)(1),
(2) Date: Apr. 25, 2023

(87) PCT Pub. No.: WO2022/091593
PCT Pub. Date: May 5, 2022

(65) Prior Publication Data
US 2023/0307966 A1    Sep. 28, 2023

(30) Foreign Application Priority Data

Oct. 26, 2020    (JP) ................. 2020-178692

(51) Int. Cl.
*H02K 1/16*    (2006.01)
*B23P 19/02*    (2006.01)
*H02K 15/021*    (2025.01)

(52) U.S. Cl.
CPC ............... *H02K 1/16* (2013.01); *B23P 19/02* (2013.01); *H02K 15/021* (2025.01)

(58) Field of Classification Search
CPC .......... H02K 1/16; H02K 15/021; B23P 19/02
(Continued)

(56) References Cited

FOREIGN PATENT DOCUMENTS

| JP | H05219696 A | * | 1/1992 |
| JP | 5-219696 | | 8/1993 |

(Continued)

OTHER PUBLICATIONS

Machine Translation of JP_2005318763_A (Year: 2005).*
(Continued)

*Primary Examiner* — Alexander A Singh
*Assistant Examiner* — Charlie Frank Mann, Jr.
(74) *Attorney, Agent, or Firm* — STERNE, KESSLER, GOLDSTEIN & FOX P.L.L.C.

(57) ABSTRACT

A split-type laminated iron core is composed by laminating a plurality of metal plate materials having an annular shape. The metal plate material includes a first split piece and a second split piece arranged in a circumferential direction and divided by a predetermined cutting line. A shear surface formed on a first end surface of the first split piece and a shear surface formed on a second end surface of the second split piece abut on each other, and the first split piece and the second split piece are temporarily connected via the cutting line defined by a boundary between the first end surface and the second end surface so that the first end surface and the second end surface do not completely overlap.

9 Claims, 22 Drawing Sheets

(58) Field of Classification Search
USPC .... 310/216.008, 216.009, 216.011, 216.013,
310/216.015, 216.016, 216.018, 216.012,
310/216.017, 216.019, 216.021, 216.022,
310/216.023
See application file for complete search history.

(56) References Cited

FOREIGN PATENT DOCUMENTS

| | | | | |
|---|---|---|---|---|
| JP | 2005-318763 | | 11/2005 | |
| JP | 2005318763 A | * | 11/2005 | |
| JP | 2007-336608 | | 12/2007 | |
| JP | 2010-93997 | | 4/2010 | |
| JP | 2013-34294 | | 2/2013 | |
| JP | 2018-201300 | | 12/2018 | |
| JP | 2018201300 A | * | 12/2018 | ............. H01F 41/02 |

OTHER PUBLICATIONS

Machine Translation of JP_H05219696_A (Year: 1992).*
Machine Translation of JP_2018201300_A (Year: 2018).*
International Search Report issued in International Patent Application No. PCT/JP2021/033049, dated Nov. 22, 2021.
Written Opinion issued in International Patent Application No. PCT/2021/033049, dated Nov. 22, 2021.

* cited by examiner

SPLIT-TYPE LAMINATED IRON CORE AND METHOD FOR MANUFACTURING SPLIT-TYPE LAMINATED IRON CORE

TECHNICAL FIELD

The present disclosure relates to a split-type laminated iron core and a method for manufacturing a split-type laminated iron core.

BACKGROUND ART

Patent Literature 1 discloses a method for manufacturing a split-type laminated iron core that includes the steps of punching out a punched member in which a plurality of cutting lines are provided in advance in a yoke material from a metal plate by performing cutting and bending and pushing back on the metal plate, and laminating a plurality of the punched members punched from the metal plate to form a laminated body. The yoke material includes a plurality of yoke pieces, and is configured by temporarily connecting end portions of adjacent yoke pieces to each other at the cutting line. Therefore, by applying an external force to the laminated body, the yoke material can be separated into a plurality of yoke pieces along the cutting line.

CITATION LIST

Patent Literature

Patent Literature 1: JP2005-318763A

SUMMARY OF INVENTION

Technical Problem

The pushing back of Patent Literature 1 includes pressing a cut and bent portion of the metal plate with a stripper and a die at a pushback station. As a result, the cut and bent portion is completely pushed back to the original metal plate to be flush with the metal plate, and the cutting line is formed in the punched member. However, here, a holding force between the temporarily connected yoke pieces on the cutting line becomes strong, and a large force may be required to separate the yoke material.

Accordingly, the present disclosure describes a split-type laminated iron core that can be separated with a smaller force and a method for manufacturing the split-type laminated iron core.

Solution to Problem

An example of a split-type laminated iron core may be composed by laminating a plurality of metal plate materials having an annular shape. The metal plate material may include a first split piece and a second split piece arranged in a circumferential direction and divided by a predetermined cutting line. A shear surface formed on a first end surface of the first split pieced and a shear surface formed on a second end surface of the second split piece may abut on each other, and the first split piece and the second split piece may be temporarily connected via the cutting line defined by a boundary between the first end surface and the second end surface so that the first end surface and the second end surface do not completely overlap.

An example of a method for manufacturing a split-type laminated iron core may include the step of forming a cut and bent piece including a first end surface and a base material portion including a second end surface corresponding to the first end surface by cutting and bending a predetermined part of a metal plate along a predetermined cutting line. The example of the method may further include the step of making a shear surface formed on the first end surface and a shear surface formed on the second end surface abut on each other by partially pushing back the cut and bent piece against the base material portion and temporarily connecting the cut and bent piece and the base material portion via the cutting line defined by a boundary between the first end surface and the second end surface so that the first end surface and the second end surface do not completely overlap. The example of the method may further include the steps of punching the metal plate to include the portion without completely press-fitting the cut and bent piece into the base material portion to form metal plate materials having an annular shape and laminating a plurality of the metal plate materials.

Advantageous Effects of Invention

According to the split-type laminated iron core and the method for manufacturing the split-type laminated iron core according to the present disclosure, it is possible to separate the iron core with a smaller force.

DESCRIPTION OF EMBODIMENTS

Figure 1:
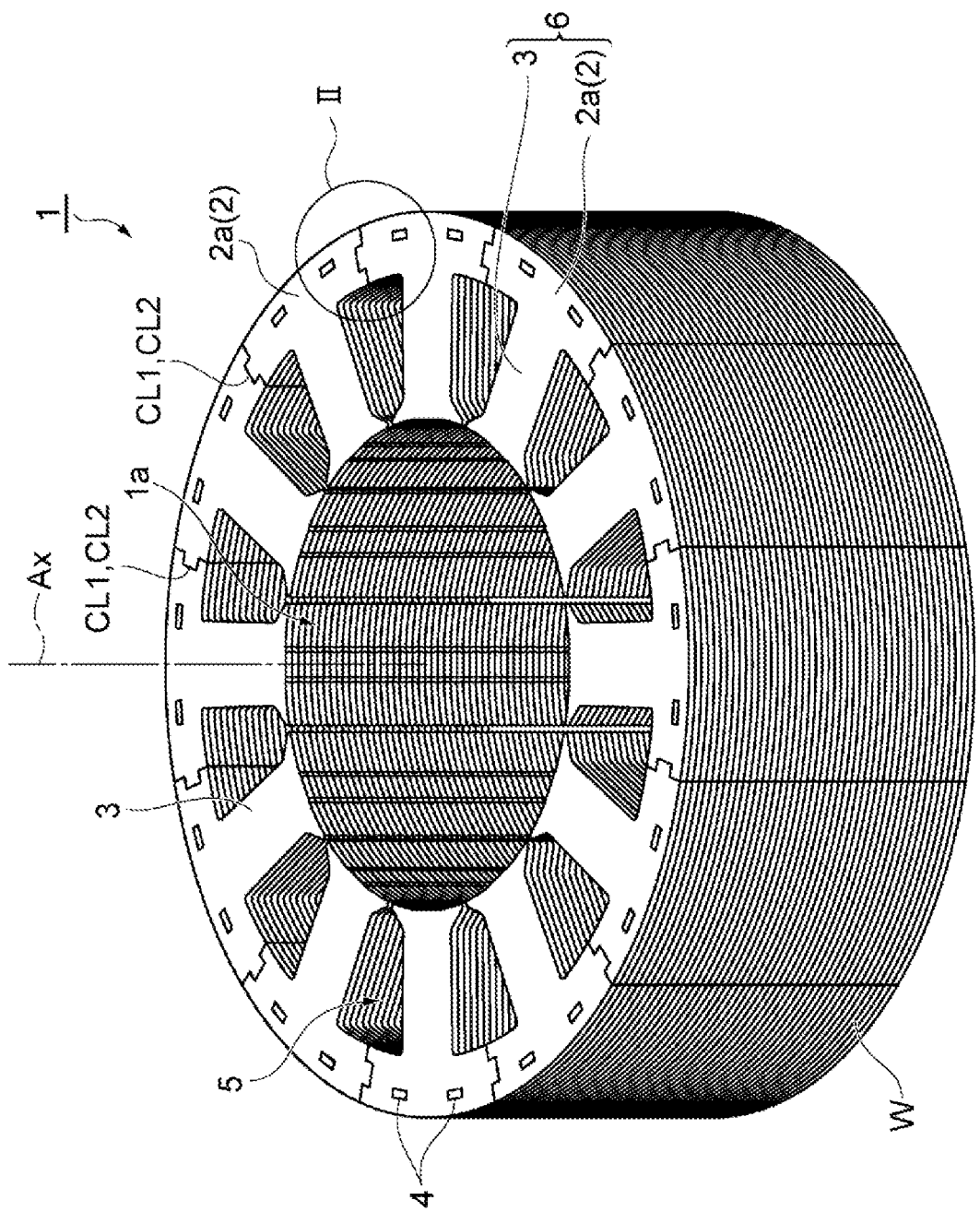
FIG. 1 is a perspective view illustrating an example of a split-type laminated stator iron core.

In the following description, the same reference numerals and letters will be used for the same elements or elements having the same functions, and redundant description will be omitted. In the present specification, an upper side, a lower side, a right side, and a left side of the drawing are based on the direction of the reference letters.

[Configuration of Laminated Stator Iron Core]

First, a configuration of a laminated stator iron core 1 (split-type laminated iron core) will be described with reference to FIGS. 1 to 9. The laminated stator iron core 1 is part of a stator. The stator is constructed by attaching windings (not illustrated) to the laminated stator iron core 1. An electric motor is configured by combining a stator and a rotor.

The laminated stator iron core 1 has a cylindrical shape. A central portion of the laminated stator iron core 1 is provided with a through hole 1a penetrating through the laminated stator iron core 1 to extend along a central axis Ax. The through hole 1a extends in a height direction (laminating direction) of the laminated stator iron core 1. A rotor can be arranged in the through hole 1a.

The laminated stator iron core 1 is a laminated body in which a plurality of punched members W (metal plate material, another metal plate material) are stacked. The laminated stator iron core 1 may be constructed by rotationally laminating the plurality of punched members W. "Rotational laminating" means laminating a plurality of punched members W while shifting angles of the punched members W relatively. Rotational laminating is performed mainly for the purpose of canceling a plate thickness deviation of the punched m ember W and increasing flatness, parallelism, and squareness of the laminated stator iron core 1. The angle of the rotational laminating may be set to any size.

The laminated stator iron core 1 includes a yoke 2, a plurality of tooth portions 3, and a plurality of crimped portions 4. The yoke 2 has an annular shape, and as exemplified in FIG. 1 and the like, extending to surround the central axis Ax. The yoke 2 may have a circular annular shape. The plurality of tooth portions 3 extend along a radial direction of the yoke 2 from an inner edge of the yoke 2 toward the central axis Ax side. That is, the plurality of tooth portions 3 protrude from the inner edge of the yoke 2 toward the central axis Ax. The plurality of tooth portions 3 may be arranged at substantially equal intervals in a circumferential direction of the yoke 2. The laminated stator iron core 1 may include twelve tooth portions 3 as illustrated in FIG. 1 and the like. A slot 5, which is a space for arranging windings, is defined between the adjacent tooth portions 3.

The crimped portion 4 may be provided on the yoke 2, for example. Although not illustrated, the crimped portion 4 may be provided on each tooth portion 3, for example. The punched members W adjacent to each other in the laminating direction may be held by the crimped portion 4. The plurality of punched members W may be held by various known methods instead of the crimped portion 4. For example, the plurality of punched members W may be joined together using, for example, an adhesive or resin material, or may be joined together by welding. Alternatively, the laminated stator iron core 1 may be obtained by providing a temporary crimp on the punched member W, holding the plurality of punched members W through the temporary crimp to obtain a laminated body, and then removing the temporary crimp from the laminated body. The term "temporary crimp" means a crimp that is used to temporarily integrate the plurality of punched members W and that is removed during a process of manufacturing a product (laminated stator iron core 1).

Figure 2:
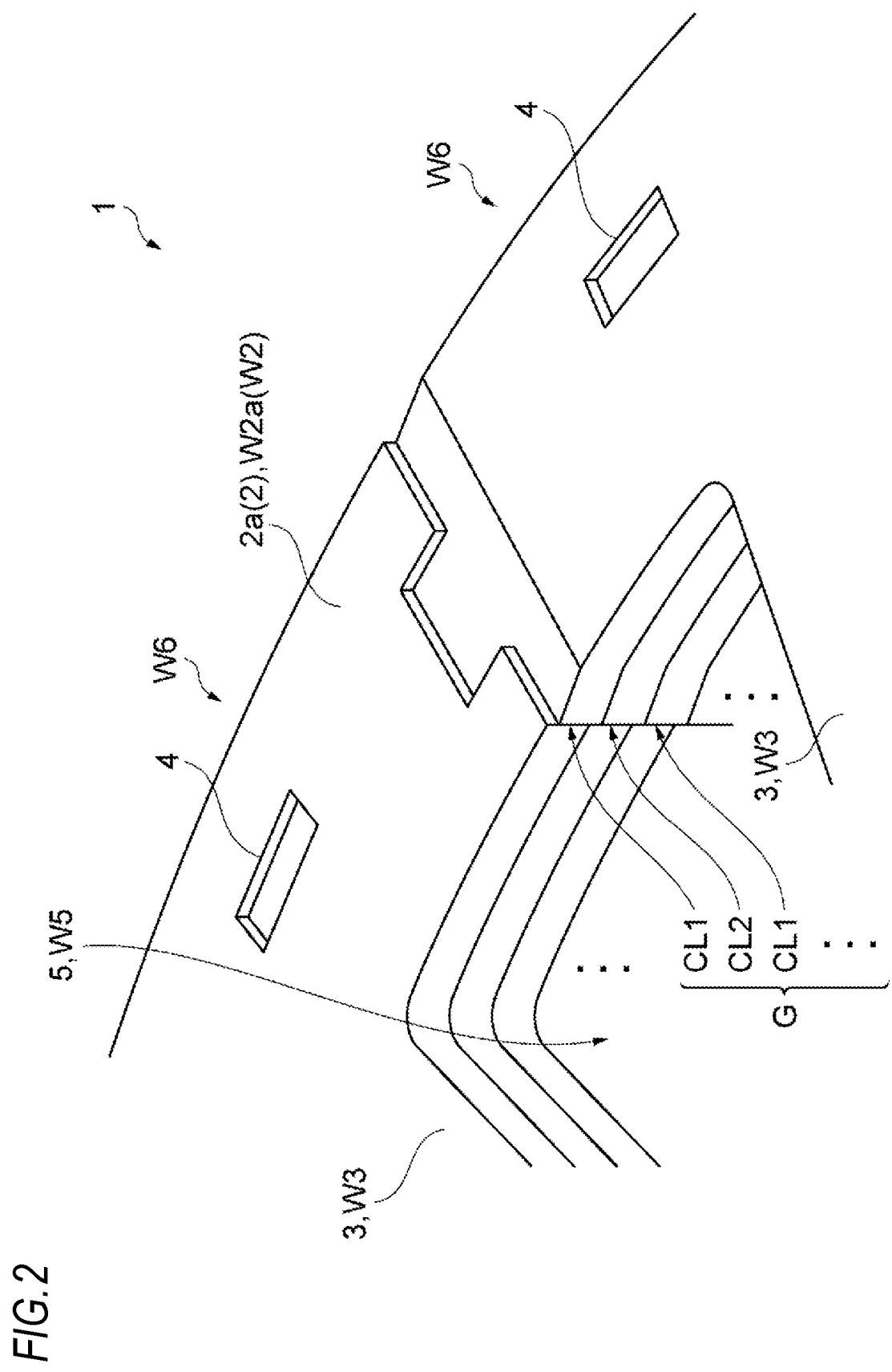
FIG. 2 is a perspective view illustrating the enlarged part II of FIG. 1.
Figure 3:
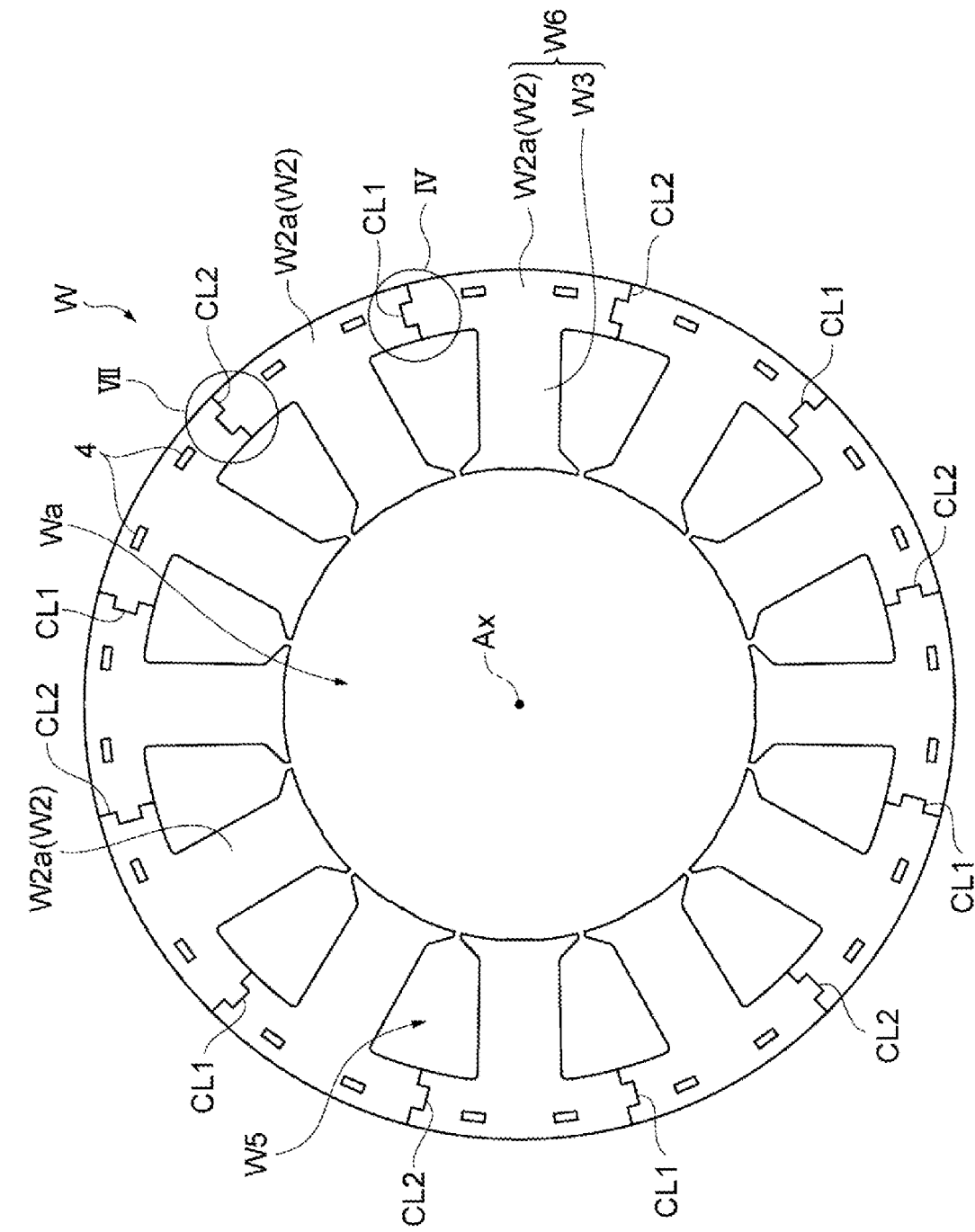
FIG. 3 is a top view illustrating a punched member forming the laminated stator iron core of FIG. 1.

Here, the punched member W will be described in more detail with reference to FIGS. 2 to 9. The punched member W is a plate-like body obtained by punching a metal plate MS (for example, an electromagnetic steel sheet) described below into a predetermined shape, and has a shape corresponding to the laminated stator iron core 1. As illustrated in FIG. 3, a central portion of the punched member W is provided with a through hole Wa. The punched member W has a yoke material W2 corresponding to the yoke 2 and a plurality of tooth pieces W3 respectively corresponding to the tooth portions 3, as illustrated in FIGS. 2 and 3. A slot W5 corresponding to the slot 5 is defined between adjacent tooth pieces W3.

The yoke material W2 is provided with a plurality of cutting lines CL1 and a plurality of cutting lines CL2 (another cutting lines) to cross between an inner peripheral edge and an outer peripheral edge of the yoke material W2. The plurality of cutting lines CL1 and CL2 may be alternately arranged at substantially equal intervals in a circumferential direction of the yoke material W2.

As illustrated in FIGS. 1 and 3, the yoke material W2 may be provided with six cutting lines CL1 and CL2 each. Here, the yoke material W2 is composed of twelve yoke pieces W2a (first split pieces, second split pieces). That is, the yoke material W2 may include a plurality of yoke pieces W2a divided by the cutting lines CL1 and CL2. The plurality of yoke pieces W2a may be arranged in the circumferential direction of the yoke material W2.

Although the details will be described below, the cutting lines CL1 and CL2 are formed by, after cutting and bending the metal plate MS, partially pushing back (in this specification, this may be referred to as "incomplete pushback") the cut and bent portions and temporarily connecting them to original positions of the metal plate MS. That is, the adjacent yoke piece W2a and the other yoke piece W2a are partially temporarily connected to each other via the cutting lines CL1 and CL2. Therefore, as illustrated in FIG. 2, a step is formed between end portions of one yoke piece W2a and the other yoke piece W2a adjacent to each other. A size of the step may be about 10% to 40% of a plate thickness of the punched member W (metal plate MS). When the plate thickness of the punched member W (metal plate MS) is about 0.50 mm, the size of the step may be, for example, about 0.05 mm to 0.2 mm.

The term "cutting and bending" as used herein means cutting processing and bending processing. The "cut and bent portion" means a portion that has undergone cutting processing and bending processing.

The cutting lines CL1 and CL2 may have an concavo-convex shape as illustrated in FIGS. 2 to 4 and 7. Specifically, an end edge CLa of one yoke piece W2a (upper side in FIG. 4, left side in FIG. 7) that is adjacent in the circumferential direction of the yoke material W2 may have a concave shape (a shape with a rectangular depression in a center), and an end edge of another yoke piece W2a (lower side in FIG. 4, right side in FIG. 7) may have a convex shape (a shape in which a center protrudes into a rectangular shape).

Figure 4:
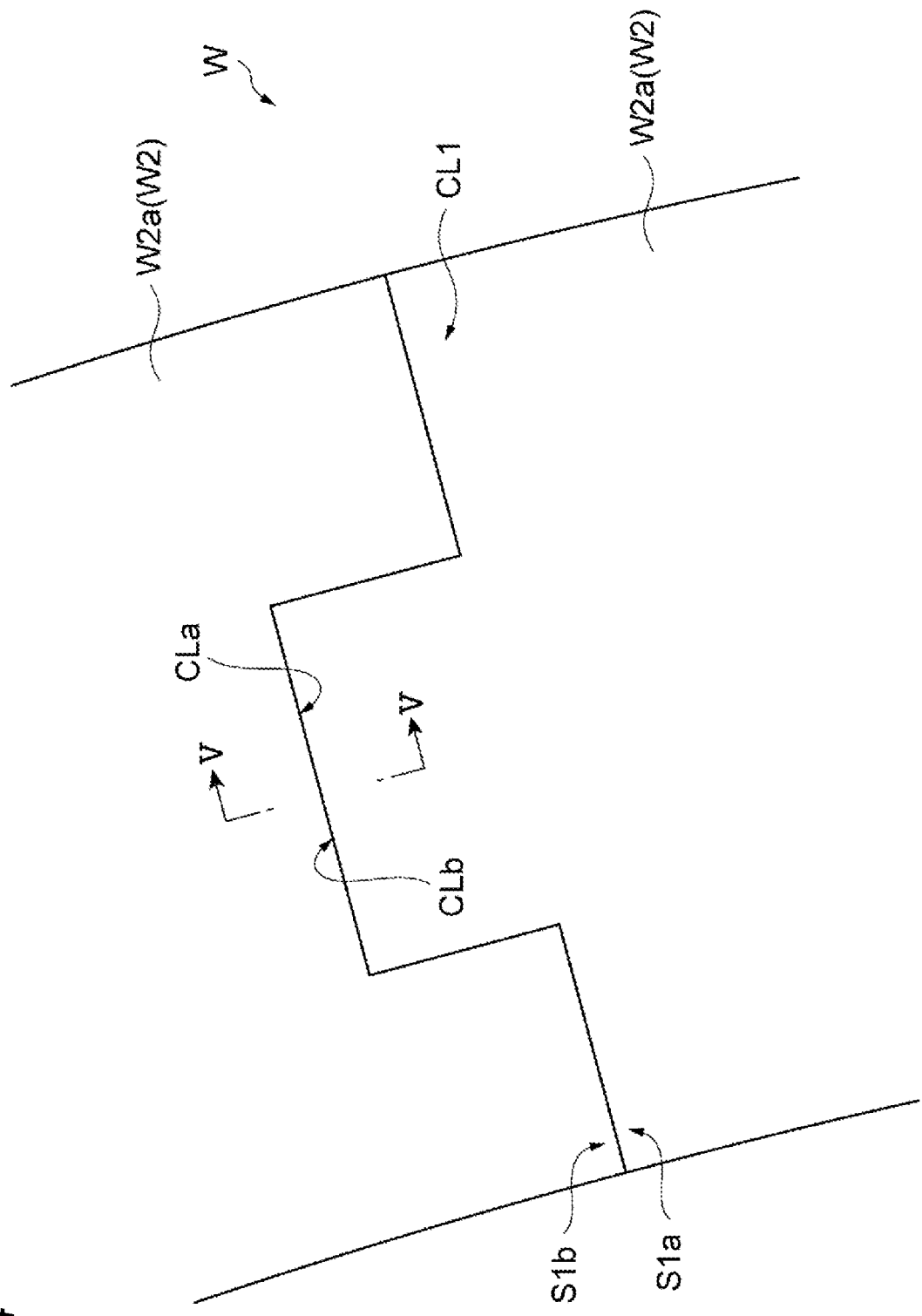
FIG. 4 is a top view illustrating the enlarged part IV of FIG. 3.

Although details will be described below, the cutting line CL1 is formed by cutting and bending using a reverse clearance. As illustrated in FIG. 4, the cutting line CL1 is formed by a boundary between an end surface S1a (first end surface) of one yoke piece W2a (upper side in FIG. 4) and an end surface S1b (second end surface) of another yoke piece W2a (lower side in FIG. 4) that are adjacent in the circumferential direction of the yoke material W2.

The "reverse clearance" means that a diameter of a punch for cutting and bending is larger than a diameter of a die hole.

Figure 5:
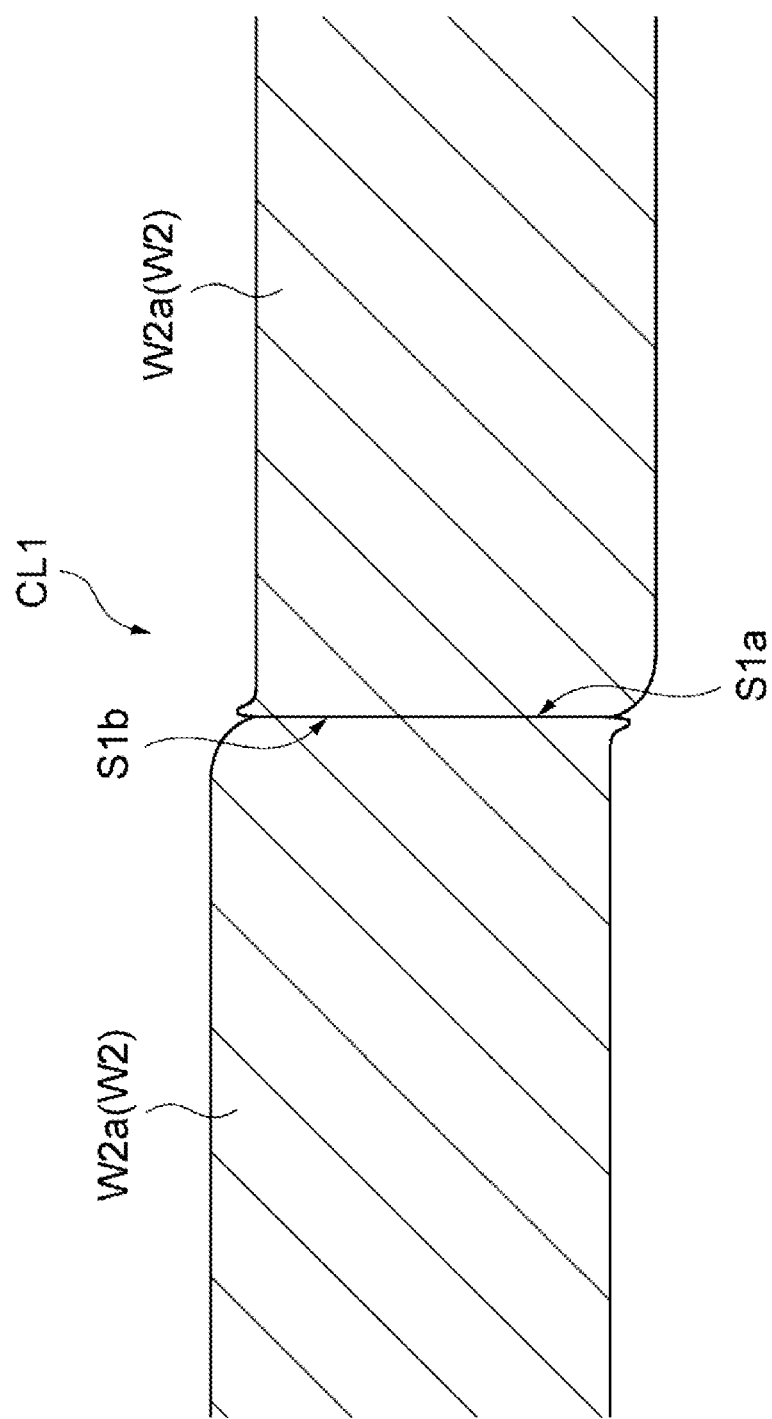
FIG. 5 is a cross-sectional view taken along the line V-V in FIG. 4.
Figure 6:
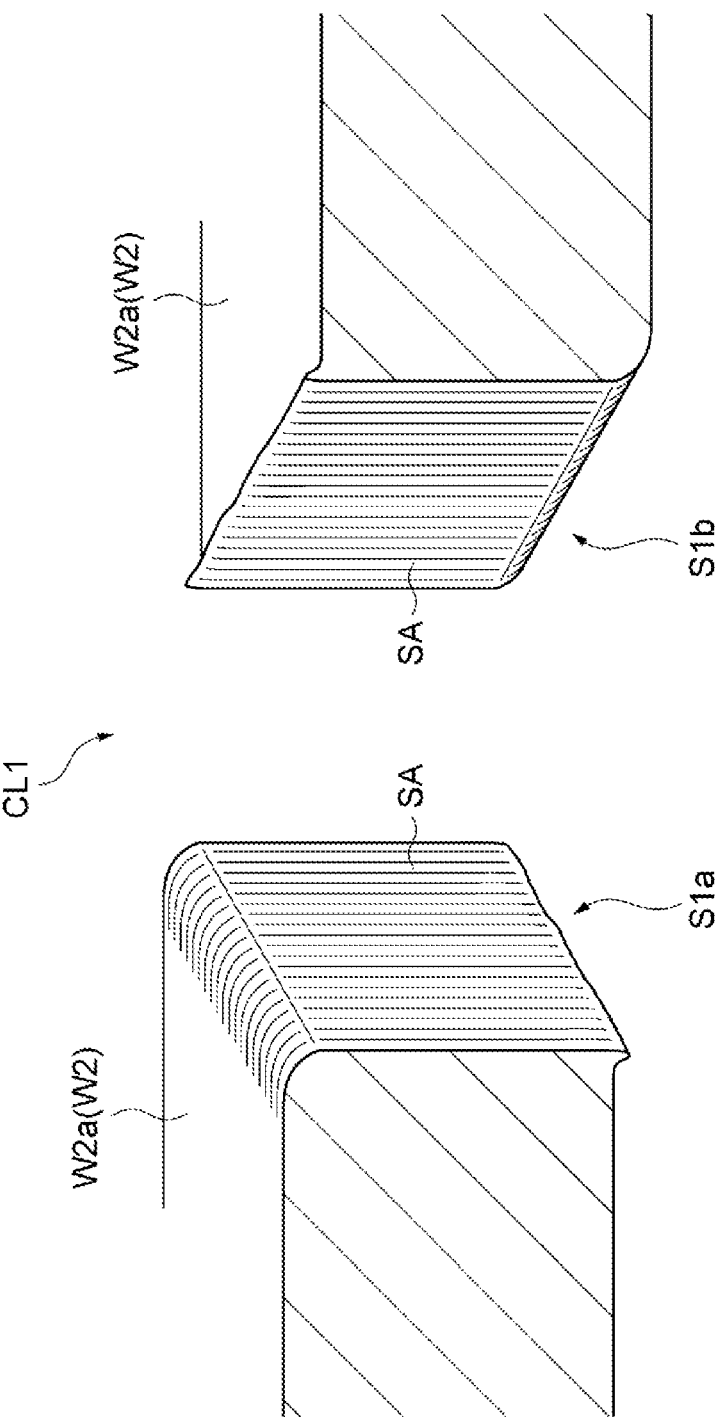
FIG. 6 is a perspective view schematically illustrating each end surface of a cut and bent piece and a base material portion in FIG. 5.

Each of the end surfaces S1a and S1b is substantially formed by shear surfaces SA, as illustrated in FIG. 6. As illustrated in FIGS. 5 and 6, the end surface S1a and the end surface S1b partially abut on each other at the shear surfaces SA. That is, the end surface S1a and the end surface S1b do not completely overlap.

Figure 7:
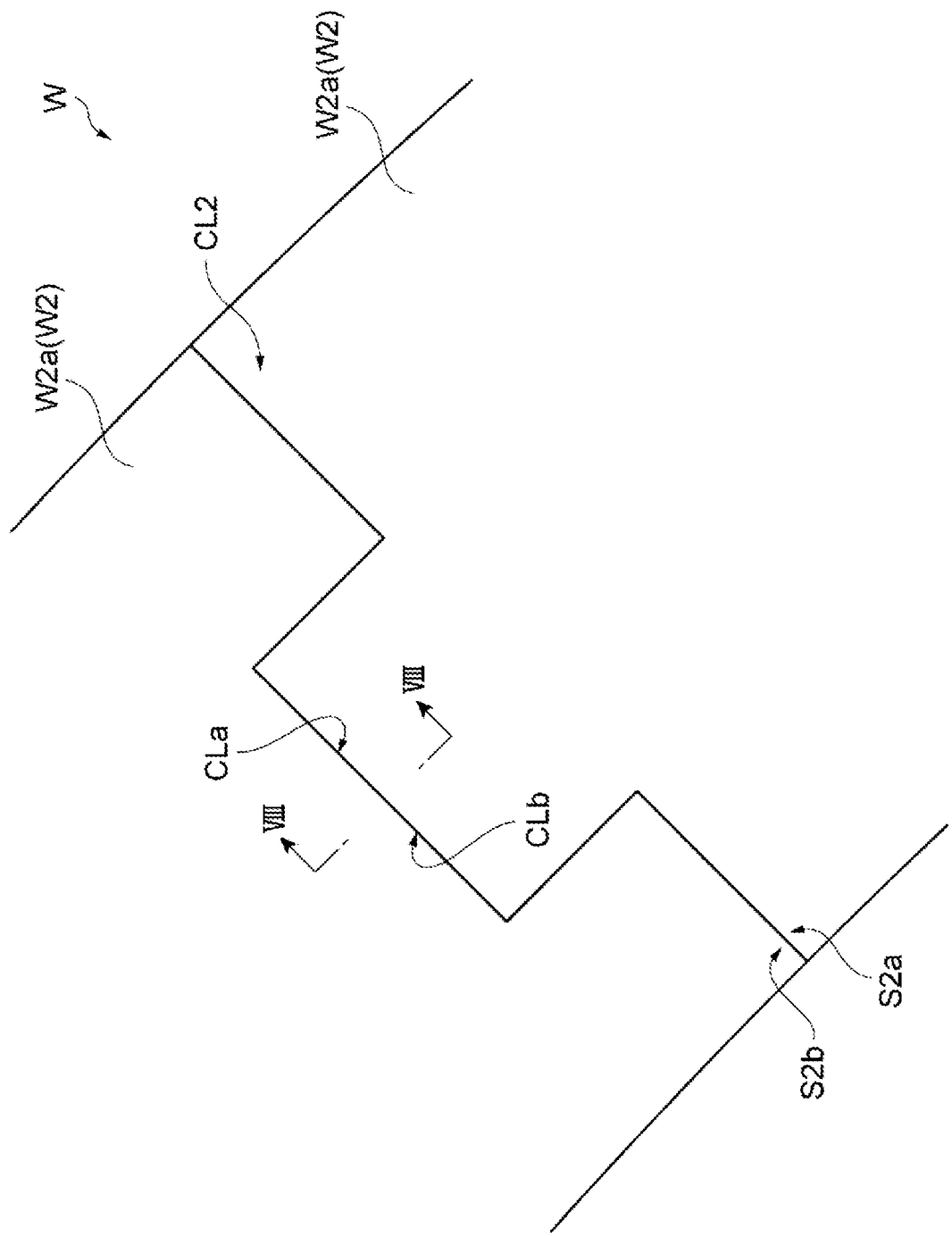
FIG. 7 is a top view illustrating the enlarged portion VII of FIG. 3.

Although details will be described below, the cutting line CL2 is formed by cutting and bending with a normal clearance. As illustrated in FIG. 7, the cutting line CL2 is defined by a boundary between the end surface S2a of one yoke piece W2a (left side in FIG. 4) and the end surface S2b of another yoke piece W2a (right side in FIG. 7) that are adjacent in the circumferential direction of the yoke material W2.

The "normal clearance" means that the diameter of the punch for cutting and bending is smaller than the diameter of the die hole. Here, when the punch is inserted into the die, a gap exists between an outer wall surface of the punch and an inner wall surface of the die hole.

Figure 8:
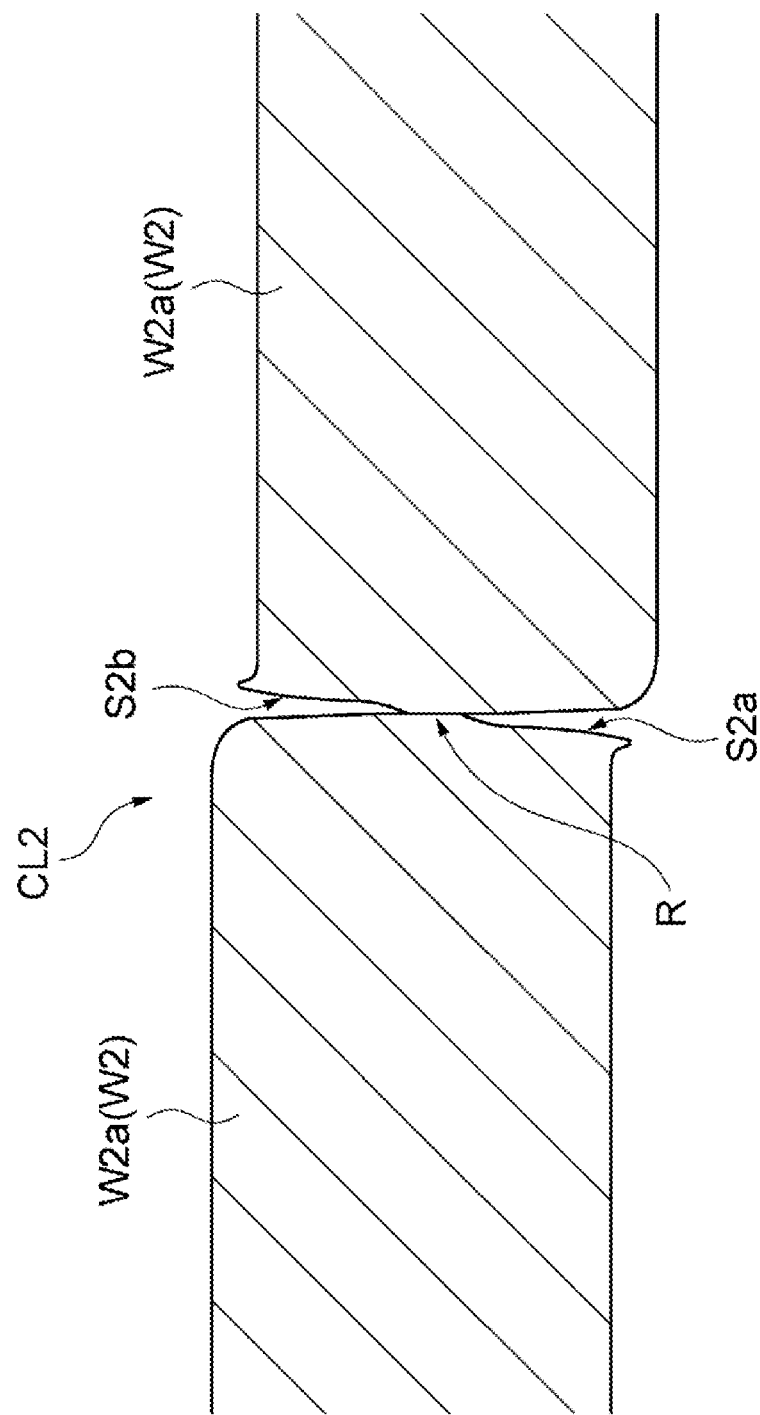
FIG. 8 is a cross-sectional view taken along the line VIII-VIII in FIG. 7.
Figure 9:
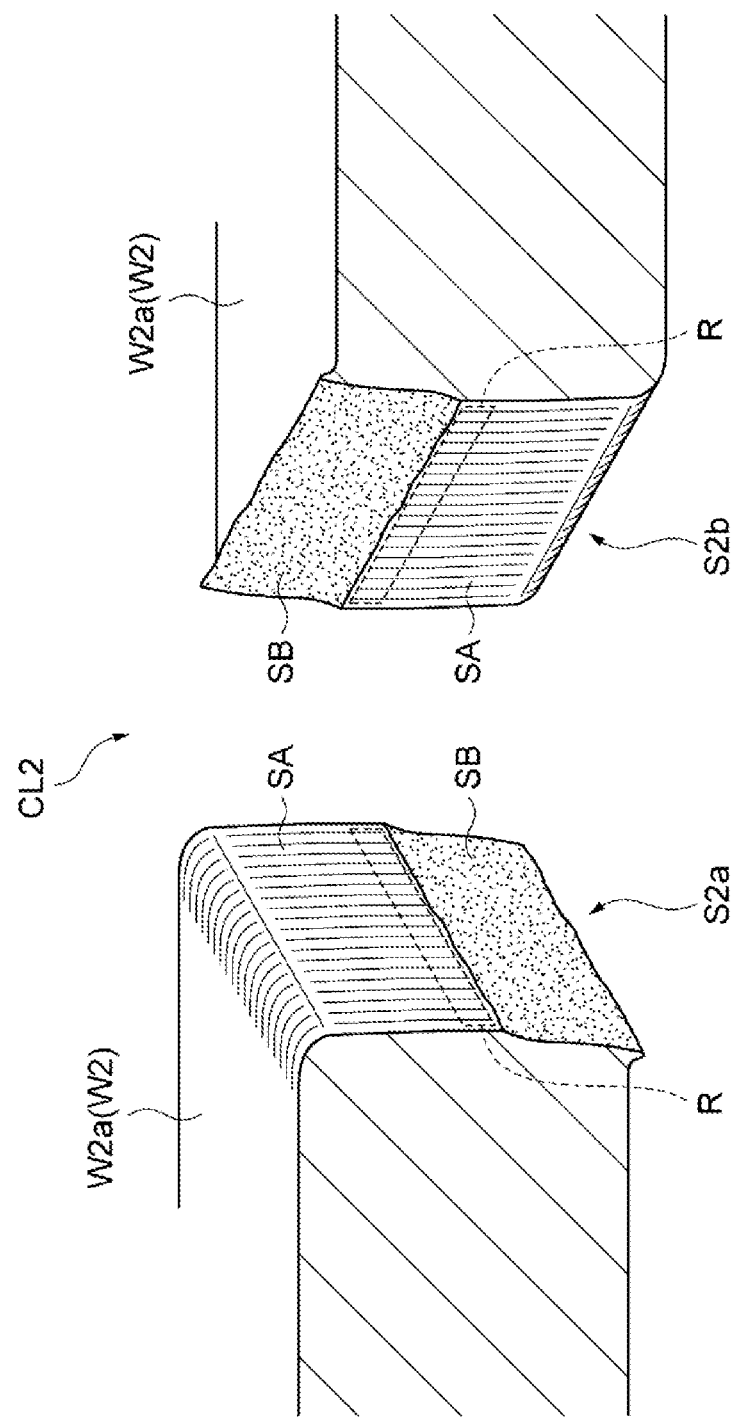
FIG. 9 is a perspective view schematically illustrating each end face of a cut and bent piece and a base material portion in FIG. 8.

The end surfaces S2a and S2b are respectively formed by a shear surface SA and a fracture surface SB, as illustrated in FIG. 9. The shear surface SA and the fracture surface SB are provided side by side in a plate thickness direction (up-down direction, laminating direction) of the yoke piece W2a. In one yoke piece W2a (left side in FIGS. 8 and 9), the shear surface SA is located on an upper surface side, and the fracture surface SB is located on a lower surface side. In the other yoke piece W2a (right side in FIGS. 8 and 9), the shear surface SA is located on the lower surface side and the fracture surface SB is located on the upper surface side.

As illustrated in FIGS. 8 and 9, the end surface S2a and the end surface S2b partially abut on each other at the shear surfaces SA (see regions R in FIGS. 8 and 9). That is, the end surface S2a and the end surface S2b do not completely overlap. On the other hand, in the end surfaces S2a and S2b, the shear surface SA and the fracture surface SB do not abut on each other.

Each tooth piece W3 extends along a radial direction of the yoke material W2 from the inner edge of the yoke material W2 toward the central axis Ax. That is, each tooth piece W3 protrudes from the inner edge of the yoke material W2 toward the central axis Ax. One plate material W6 may be formed by integrally providing one tooth piece W3 with one yoke piece W2a. That is, the punched member W may be configured by temporarily connecting a plurality of plate materials W6 via the cutting lines CL1 and CL2 in the circumferential direction of the yoke material W2.

Returning to FIG. 1, the laminated stator iron core 1 is obtained by laminating a plurality of punched members W as described above. More specifically, the plurality of punched members W are laminated such that the yoke materials W2, the tooth pieces W3, and the cutting lines CL1 and CL2 overlap each other in the laminating direction. Therefore, when a predetermined force is applied to the laminated stator iron core 1 and the laminated iron core 1 is separated along the cutting lines CL1 and CL2, a plurality of iron core pieces 6 (twelve iron core pieces 6 in the example of FIG. 1) are obtained from one laminated stator iron core 1. The iron core piece 6 is a laminated body in which a plurality of plate materials W6 are laminated. In other words, the laminated stator iron core 1 is constructed by combining a plurality of iron core pieces 6.

One iron core piece 6 is composed of one yoke portion 2a and one tooth portion 3. The yoke portion 2a is a part of the yoke 2 when the yoke 2 is separated by the cutting lines CL1 and CL2. That is, the laminated stator iron core 1 is integrated by temporarily connecting the iron core pieces 6 adjacent in a circumferential direction of the central axis Ax at end portions (cutting lines CL1 and CL2) of the yoke portions 2a.

When a plurality of cutting lines overlapping each other in the laminating direction is defined as a cutting line group G, the cutting line group G may be composed of only a plurality of cutting lines CL1. The cutting line group G may be composed of only a plurality of cutting lines CL2. The cutting line group G may be composed of including at least one cutting line CL1 and at least one cutting line CL2. When the cutting line group G includes the cutting lines CL1 and CL2, as illustrated in FIG. 2, the cutting lines CL1 and CL2 may be alternately arranged in the laminating direction, or the cutting lines CL1 and CL2 may be arranged regularly or irregularly.

[Manufacturing Apparatus for Laminated Stator Iron Core]

Figure 10:
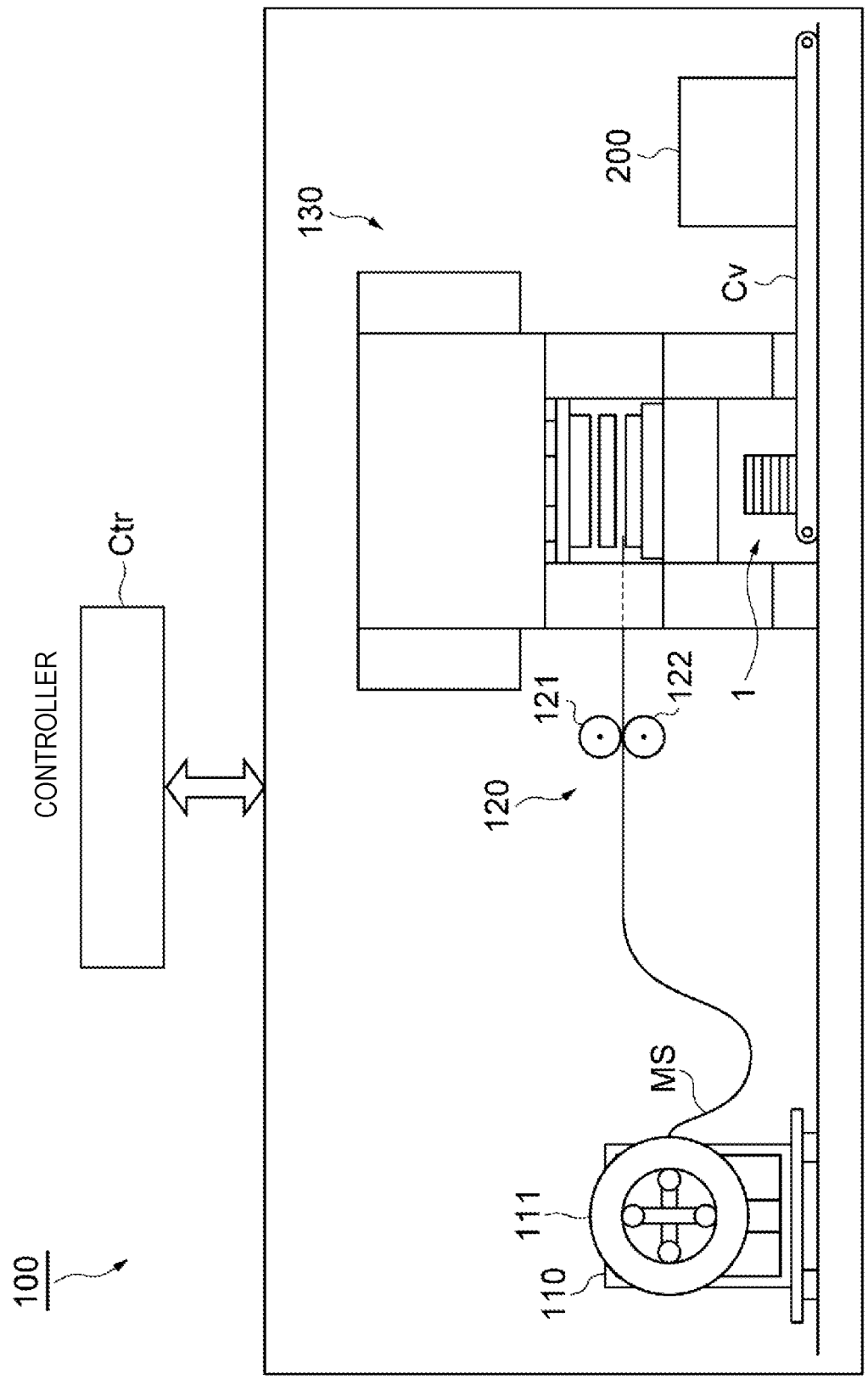
FIG. 10 is a schematic diagram illustrating an example of a manufacturing apparatus for a laminated stator iron core.

Next, with reference to FIG. 10, a manufacturing apparatus 100 for a laminated stator iron core will be described. The manufacturing apparatus 100 is configured to manufacture the laminated stator iron core 1 from the metal plate MS having a strip shape. The manufacturing apparatus 100 includes an uncoiler 110, a delivery device 120, a pressing device 130, an annealing furnace 200, and a controller Ctr (control unit).

The uncoiler 110 is configured to rotatably hold a coil material 111. The coil material 111 is obtained by winding the metal plate MS in a coil shape (spiral shape). The delivery device 120 includes a pair of rollers 121 and 122 that pinch the metal plate MS from above and below. The pair of rollers 121 and 122 are configured to rotate and stop based on an instruction signal from the controller Ctr to deliver the metal plate MS intermittently and sequentially toward the pressing device 130.

The pressing device 130 is configured to operate based on instruction signals from the controller Ctr. The pressing device 130 may be configured, for example, to sequentially cut, bend or punch the metal plate MS delivered by the delivery device 120 with a plurality of punches to form a plurality of punched members W. The pressing device 130 may be configured to sequentially laminate the plurality of punched members W obtained by punching to form the laminated stator iron core 1. The laminated iron core 1 formed by the pressing device 130 may be conveyed to the annealing furnace 200 by, for example, a conveyor Cv, or may be conveyed to the annealing furnace 200 manually. Details of the pressing device 130 will be described below.

The annealing furnace 200 is configured to operate based on instruction signals from the controller Ctr. The annealing furnace 200 is configured to heat the laminated stator iron core 1 conveyed from the pressing device 130 at a predetermined temperature (for example, about 750° C. to 800° C.) for a predetermined time (for example, about 1 hour). By heating the laminated stator iron core 1 by the annealing furnace 200, oil (stamping oil) adhering to the punched member W is evaporated and removed, and strain remaining inside the punched member W is removed.

The controller Ctr is configured to generate signals for operating the delivery device 120, the pressing device 130, the annealing furnace 200, and the conveyor Cv based on a program recorded in a non-transitory recording medium (not illustrated) or operation input from an operator. The controller Ctr is configured to send the signals to the delivery device 120, the pressing device 130, the annealing furnace 200, and the conveyor Cv.

[Details of Pressing Device]

Figure 11:
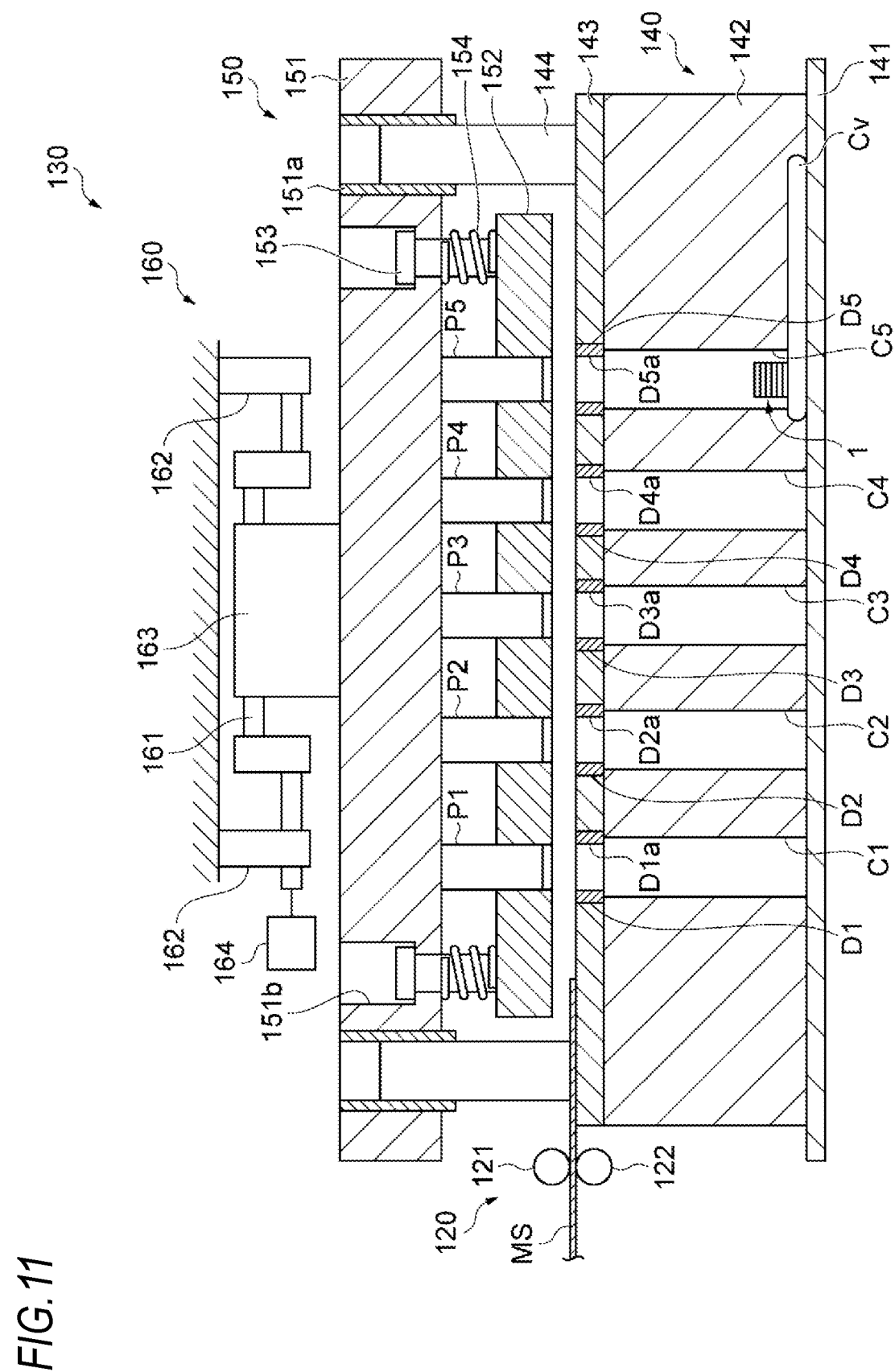
FIG. 11 is a schematic cross-sectional view illustrating an example of a press working apparatus.

Next, details of the pressing device 130 will be described with reference to FIGS. 11 to 19. The pressing device 130 includes a lower die 140, an upper die 150, and a press 160, as illustrated in FIG. 11. The lower die 140 includes a base 141, a die holder 142, a die plate 143 (pinching member), and a plurality of guide posts 144.

The base 141 is fixed on a floor, for example, and functions as a foundation for the entire pressing device 130. The die holder 142 is supported on the base 141. The die holder 142 is formed with a plurality of discharge holes C1 to C5. The discharge holes C1 to C5 may extend in the up-down direction inside the die holder 142. Materials (for example, punched members W, waste materials, or the like) punched from the metal plate MS are discharged through the discharge holes C1 to C5.

The die plate 143 is configured to press the metal plate MS together with a plurality of punches P1 to P5. The die plate 143 includes a plurality of dies D1 to D5. The dies D1 to D5 are arranged at positions corresponding to the punches P1 to P5, respectively, and include die holes D1a to D5a through which the corresponding punches P1 to P5 can be inserted. The dies D1 to D5 are arranged in this order from an upstream side to a downstream side in a conveying direction of the metal plate MS.

The die D1 forms together with the punch P1 a first punching unit for punching the metal plate MS. A metal piece punched out from the metal plate MS by the first punching unit is discharged to the outside of the pressing device 130 through the discharge hole C1. The die D2 forms a second punching unit for cutting and bending the metal plate MS together with the punch P2. Details of the second punching unit will be described below.

The die D3 forms together with the punch P3 a third punching unit for punching or half-punching the metal plate MS. A metal piece punched out from the metal plate MS by the third punching unit is discharged to the outside of the pressing device 130 through the discharge hole C3. The die D4 forms together with the punch P4 a fourth punching unit for punching the metal plate MS. A metal piece punched out from the metal plate MS by the fourth punching unit is discharged to the outside of the pressing device 130 through the discharge hole C4.

The die D5 forms together with the punch P5 a fifth punching unit for punching the metal plate MS. A punched member W punched out from the metal plate MS by the first punching unit is discharged to the outside of the pressing device 130 through the discharge hole C5. Details of the fifth punching unit will be described below.

A plurality of guide posts 144 extend linearly upward from the die holder 142, as illustrated in FIG. 11. The plurality of guide posts 144 are configured to guide the upper die 150 in an up-down direction together with guide bushes 151a, which will be described below.

The plurality of guide posts 144 may be attached to the upper die 150 to extend downward from the upper die 150.

The upper die 150 includes a punch holder 151, a stripper 152 (pinching member), a plurality of punches P1 to P5, and a pilot pin (not illustrated). The punch holder 151 is arranged above the die holder 142 and the die plate 143 to face the die holder 142 and the die plate 143. The punch holder 151 is configured to hold the plurality of punches P1 to P5 on a lower surface side of the punch holder 151.

The punch holder 151 is provided with a plurality of guide bushes 151a. The plurality of guide bushes 151a are positioned to correspond to the plurality of guide posts 144, respectively. The guide bush 151a has a cylindrical shape, and the guide post 144 can be inserted through an inner space of the guide bush 151a. When the guide post 144 is attached to the upper die 150, the guide bush 151a may be provided to the lower die 140.

The punch holder 151 is provided with a plurality of through holes 151b. A stepped step is formed on an inner peripheral surface of the through hole 151b. Therefore, a diameter of a lower portion of the through hole 151b is set smaller than a diameter of an upper portion of the through hole 151b.

The stripper 152 is configured to remove from the punches P1 to P5 the metal plate MS that has bitten into the punches P1 to P5 when the punches P1 to P5 press the metal plate MS. The stripper 152 is arranged between the dies D1 to D5 and the punch holder 151.

The stripper 152 is connected with the punch holder 151 via a connecting member 153. The connecting member 153 includes a main body portion having an elongated shape and a head portion provided at an upper end of the main body portion. The main body portion of the connecting member 153 is inserted into a lower portion of the through hole 151b, and can move vertically within the through hole 151b. A lower end of the main body portion of the connecting member 153 is fixed to the stripper 152. A biasing member 154 (for example, compression coil springs or the like) configured to apply a biasing force in a direction separating the punch holder 151 and the stripper 152 may be attached around the main body portion of the connecting member 153.

The head portion of the connecting member 153 is arranged in an upper portion of the through hole 151b. An outer shape of the head portion of the connecting member 153 is set larger than the outer shape of the main body portion of the connecting member 153 when viewed from above. Therefore, the head portion of the connecting member 153 can move vertically in the upper portion of the through hole 151b. However, since the step of the through hole 151b functions as a stopper, the head portion of the connecting member 153 cannot move to a lower portion of the through hole 151b. Therefore, the stripper 152 is suspended and held by the punch holder 151 to be vertically movable relative to the punch holder 151.

The stripper 152 is provided with through holes at positions corresponding to the punches P1 to P5. Each through hole extends in the up-down direction. Respective through holes communicate with the corresponding die holes D1a to D5a when viewed from above. Lower portions of the punches P1 to P5 are accommodated in respective through holes. The lower portions of the punches P1 to P5 are respectively slidable within the through holes.

The press 160 is configured to move the upper die 150 vertically. The press 160 includes a crankshaft 161, a fixed member 162, a connecting member 163, and drive mechanism 164. The crankshaft 161 includes a main shaft (crank journal), an eccentric shaft (crank pin) positioned eccentrically from the main shaft, and a connecting member (crank arm) connecting the shafts.

The fixed member 162 is fixed to a fixing wall or the like and configured to rotatably hold the main shaft of the crankshaft 161. The connecting member 163 connects the crankshaft 161 and the punch holder 151. The eccentric shaft of the crankshaft 161 is rotatably connected to one end portion of the connecting member 163. The punch holder 151 is connected to the other end portion of the connecting member 163 via a rotating shaft (not illustrated).

The drive mechanism 164 is connected to the main shaft of the crankshaft 161 via, for example, a flywheel and gearbox (not illustrated). The drive mechanism 164 operates based on the instruction signal from the controller Ctr, and rotates the main shaft of the crankshaft 161. When the main shaft of the crankshaft 161 rotates, the eccentric shaft circularly moves around the main shaft. Accordingly, the punch holder 151 reciprocates vertically between a top dead center and a bottom dead center.

Figure 12:
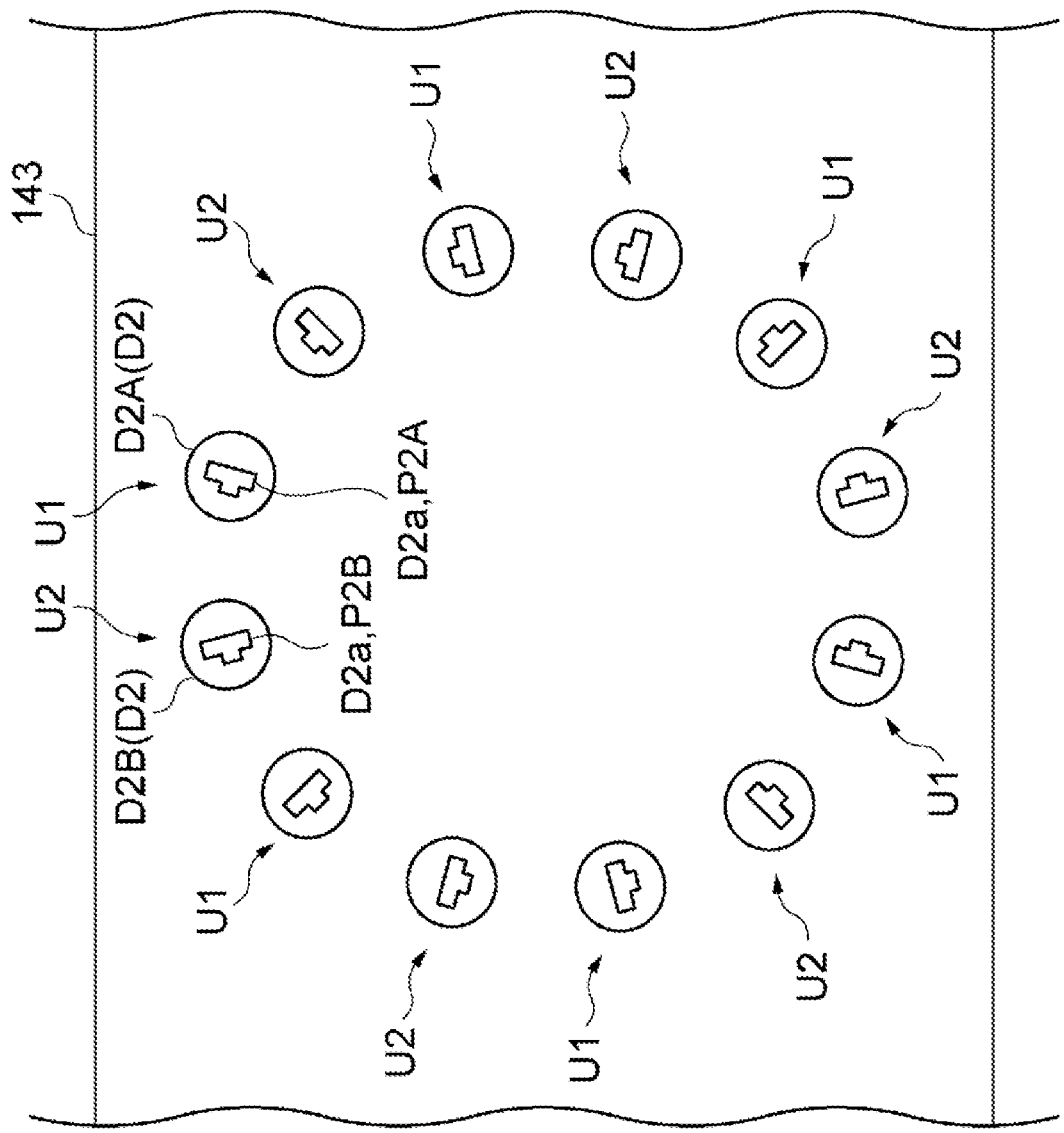
FIG. 12 is a top view illustrating an example of a plurality of dies forming a second punching unit.

Here, a configuration of the second punching unit described above will be described in more detail with reference to FIGS. 12 to 17. As illustrated in FIG. 12, the second punching unit includes a plurality of units U1 for cutting and bending with a reverse clearance and a plurality of units U2 for cutting and bending with a normal clearance. The plurality of units U1 and the plurality of units U2 are arranged on the die plate 143 to have a circular shape as a whole in plan view illustrated in FIG. 12. As illustrated in FIG. 12, the plurality of units U1 and the plurality of units U2 may be alternately aligned in a direction (circumferential direction) in which the units are arranged.

Figure 13:
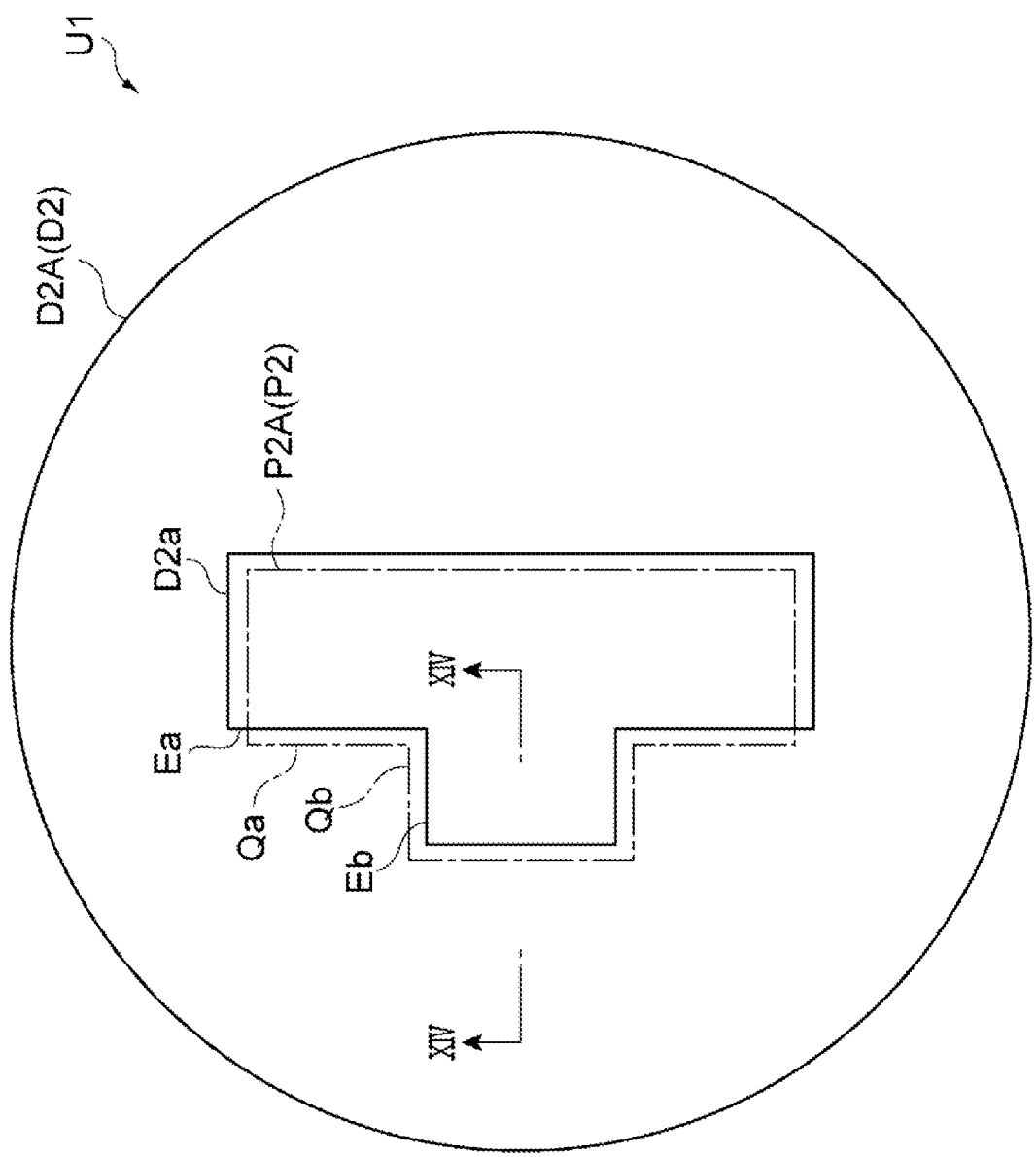
FIG. 13 is a top view illustrating an example of a die and a punch for cutting and bending with a reverse clearance.
Figure 14:
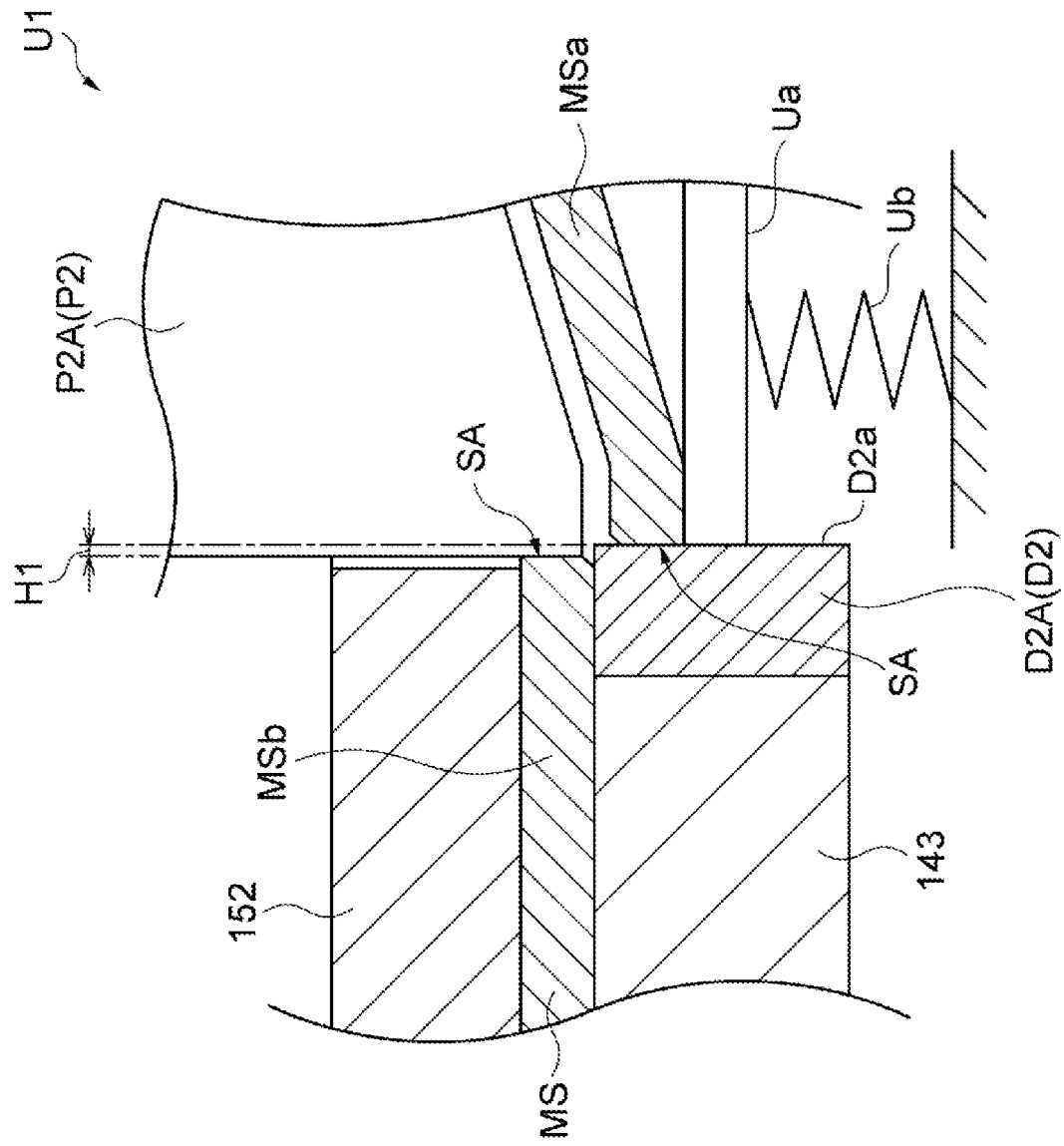
FIG. 14 is a cross-sectional view taken along the line XIV-XIV of FIG. 13.

The unit U1 includes a pushback plate Ua, a biasing member Ub, a die D2A, and a punch P2A, as illustrated in FIGS. 13 and 14. The pushback plate Ua is arranged in a die hole D2a of the die D2A and is biased upward by the biasing member Ub.

As illustrated in FIG. 13, the die hole D2a of the die D2A includes a central portion having a substantially rectangular shape when viewed from above, and a protruding portion protruding outward from one long side Ea (left long side in FIG. 13) of the central portion. The shape of the one long side Ea and an outline Eb of the protruding portion corresponds to the cutting line CL1.

When a direction in which the upper die 150 is positioned with respect to the lower die 140 is defined as upward, the punch P2A is arranged above the die hole D2a of the die D2A to correspond one-to-one with the die D2A. A plan view of the second punching unit illustrated in FIG. 12 is synonymous with a view of the second punching unit from above. The punch P2A has a shape corresponding to the die hole D2a of the die D2A when viewed from above. The punch P2A includes a central portion that has a substantially rectangular shape when viewed from above, and a protruding portion that protrudes outward from one long side Qa (left long side in FIG. 13) of the central portion.

One long side Qa of the punch P2A and an outline Qb of the protruding portion are located outside one long side Ea of the die hole D2a of the die D2A and the outline Eb of the protruding portion. That is, in plan view, a part forming one long side Qa and the outline Qb of the protruding portion of the punch P2A overlaps a part forming one long side Ea and the outline Eb of the protruding portion of the die hole D2a of die D2A. Therefore, as illustrated in FIG. 14, a reverse clearance H1 exists in an overlapping portion of the punch P2A and the die hole D2a of the die D2A. A size of the reverse clearance H1 may be, for example, about 1% to 2% of the plate thickness of the punched member W (metal plate MS). Alternatively, when the plate thickness of the punched member W (metal plate MS) is about 0.50 mm, the size of the reverse clearance H1 may be, for example, about 5 μm to 10 μm.

When the metal plate MS is cut and bent by the punch P2A and the die hole D2a of the die D2A, a cut and bent piece MSa and a base material portion MSb are formed as illustrated in FIG. 14. The base material portion MSb is a remaining portion that is not cut and bent. The cut and bent piece MSa is partially press-fitted into the base material portion MSb by the pushback plate Ua and the biasing member Ub (incomplete pushback processing). The shear surface SA is formed on most of each of the end surfaces of the cut and bent piece MSa and the base material portion MSb.

Figure 15:
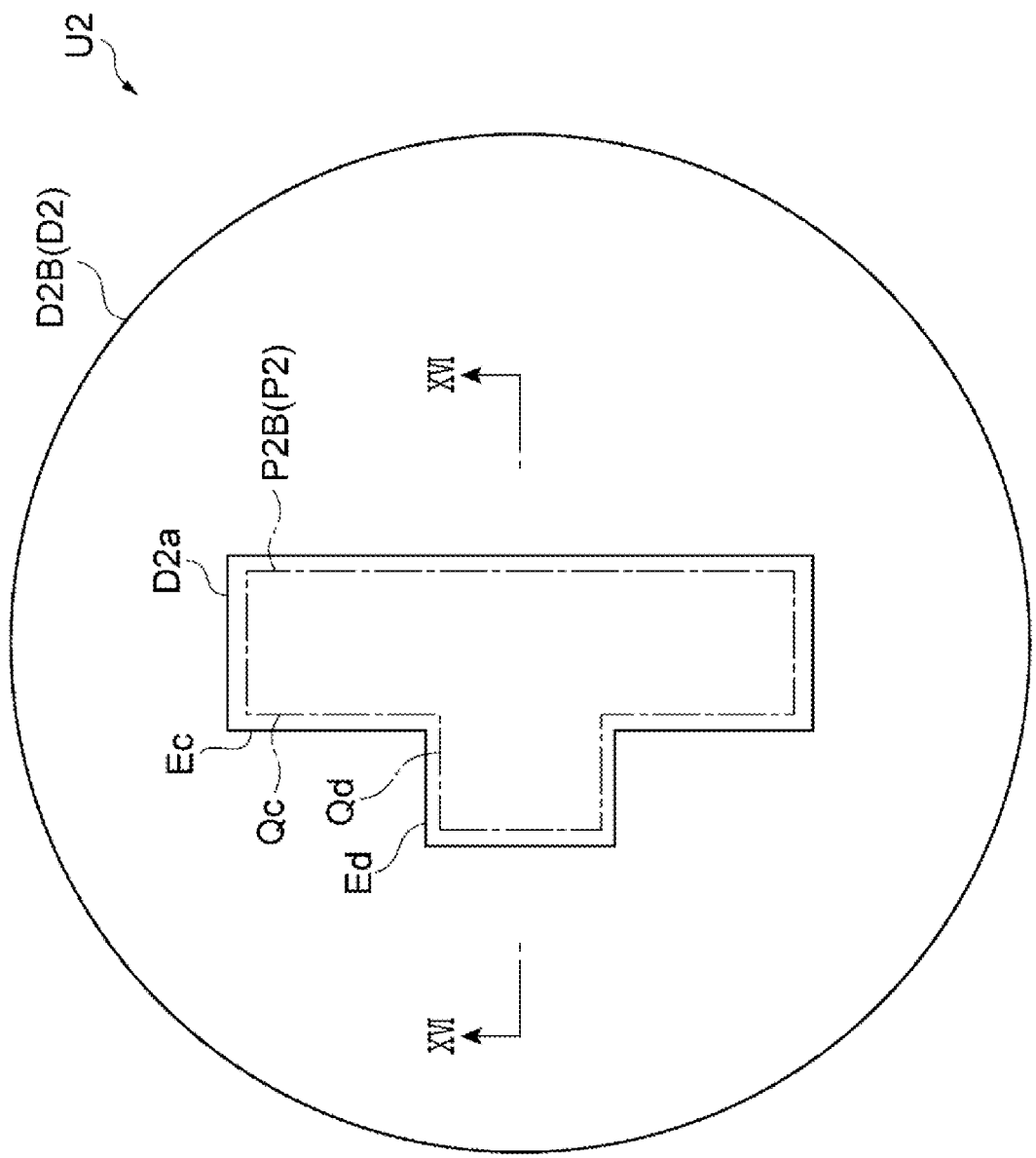
FIG. 15 is a top view illustrating an example of a die and a punch for cutting and bending with a normal clearance.
Figure 16:
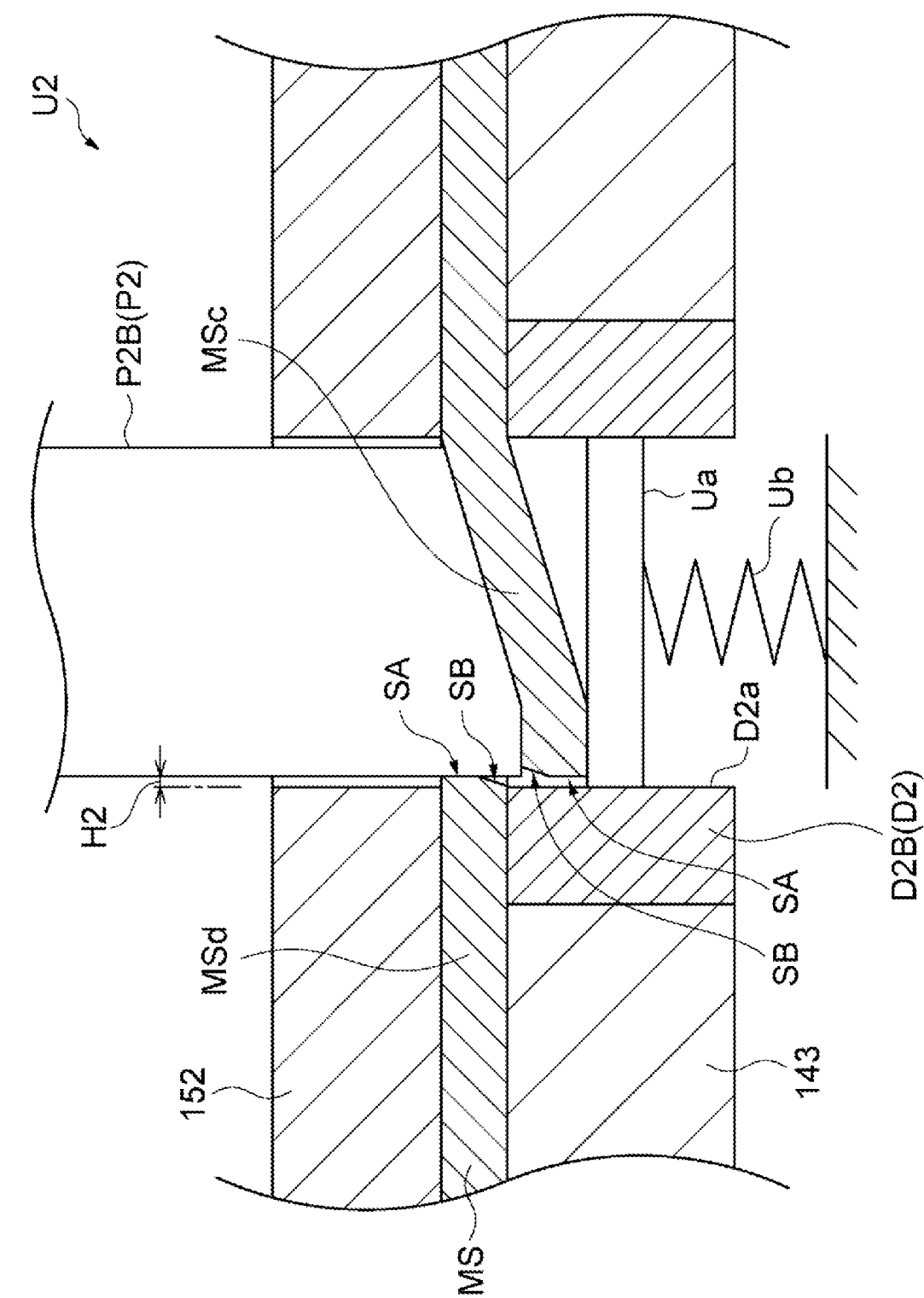
FIG. 16 is a cross-sectional view taken along the line XVI-XVI of FIG. 15.

The unit U2 includes a pushback plate Ua, a biasing member Ub, a die D2B, and a punch P2B, as illustrated in FIGS. 15 and 16. The pushback plate Ua is arranged in a die hole D2a of the die D2B and is biased upward by the biasing member Ub.

The die hole D2a of the die D2B has the same shape as the die hole D2a of the die D2A, as illustrated in FIG. 15. That is, the die hole D2a of the die D2B includes a central portion having a substantially rectangular shape when viewed from above, and a protruding portion protruding outward from one long side Ec (left long side in FIG. 15) of the central portion. The shape of the one long side Ec and an outline Ed of the protruding portion corresponds to the cutting line CL2.

The punch P2B is arranged above the die hole D2a of the die D2B to correspond one-to-one with the die D2B. The punch P2B has a shape corresponding to the die hole D2a of the die D2B when viewed from above. The punch P2B includes a central portion that has a substantially rectangular shape when viewed from above, and a protruding portion that protrudes outward from one long side Qc (left long side in FIG. 15) of the central portion.

One long side Qc of the punch P2B and an outline Qd of the protruding portion are positioned inside one long side Ec of the die hole D2a of the die D2A and the outline Ed of the protruding portion. Therefore, as illustrated in FIG. 16, a normal clearance H2 exists in a spaced portion between the punch P2B and the die hole D2a of the die D2B. A size of the normal clearance H2 may be, for example, about 1% to 2% of the plate thickness of the punched member W (metal plate MS). Alternatively, when the plate thickness of the punched member W (metal plate MS) is about 0.50 mm, the size of the normal clearance H2 may be, for example, about 5 μm to 10 μm.

When the metal plate MS is cut and bent between the punch P2B and the die hole D2a of the die D2B, as illustrated in FIGS. 15 and 16, a cut and bent piece MSc (another cut and bent piece) and a base material portion MSd are formed. The base material portion MSd is a remaining portion that is not cut and bent. The cut and bent piece MSc is partially pressed-fitted into the base material portion MSd by the pushback plate Ua and the biasing member Ub (incomplete pushback processing). On an end surface of the cut and bent piece MSc, a fracture surface SB and a shear surface SA are formed in order from top to bottom. On an end surface of the base material portion MSd, a shear surface SA and a fracture surface SB are formed in order from top to bottom.

Next, a configuration of the fifth punching unit described above will be described in more detail with reference to FIGS. 18 and 19. A die D5 is held by the die plate 143 to be rotatable around a central axis extending in a vertical direction. A rotary holder 171 for holding the die D5 may be provided on the die plate 143, and a drive mechanism 172 for rotationally driving the rotary holder 171 may be connected to the rotary holder 171.

The drive mechanism 172 rotates the die D5 around a central axis of the die D5 based on the instruction signal from the controller Ctr. Therefore, after the punched member W punched from the metal plate MS is laminated on the punched member W punched in advance, the die D5 rotates by a predetermined angle, such that the following punched member W is rotationally laminated on the preceding punched member W. The drive mechanism 172 may be composed of, for example, a combination of rotary motors, gears, timing belts, and the like.

A drive mechanism 173, a cylinder 174, and a pusher 175 are arranged in the discharge hole C5. The drive mechanism 173 is configured to drive the cylinder 174 in the up-down direction based on the instruction signal from the controller Ctr.

The cylinder 174 is configured to support the punched member W punched from the metal plate MS by the punch P5. The punched member W is prevented from dropping. The cylinder 174 may, for example, be driven by the drive mechanism 173 to intermittently move downward as the punched members W are stacked on the cylinder 174. When a predetermined number of punched members W are laminated on the cylinder 174 to form the laminated stator iron core 1, the cylinder 174 may be driven by the drive mechanism 173 so that the cylinder 174 is lowered to a position where a surface of the cylinder 174 is at the same height with a surface of the conveyor Cv (see FIG. 19).

The pusher 175 is configured to push the laminated stator iron core 1 on the cylinder 174 to the conveyor Cv based on the instruction signal from the controller Ctr. The laminated stator iron core 1 delivered to the conveyor Cv is conveyed to the annealing furnace 200 and heat-treated.

Figure 17:
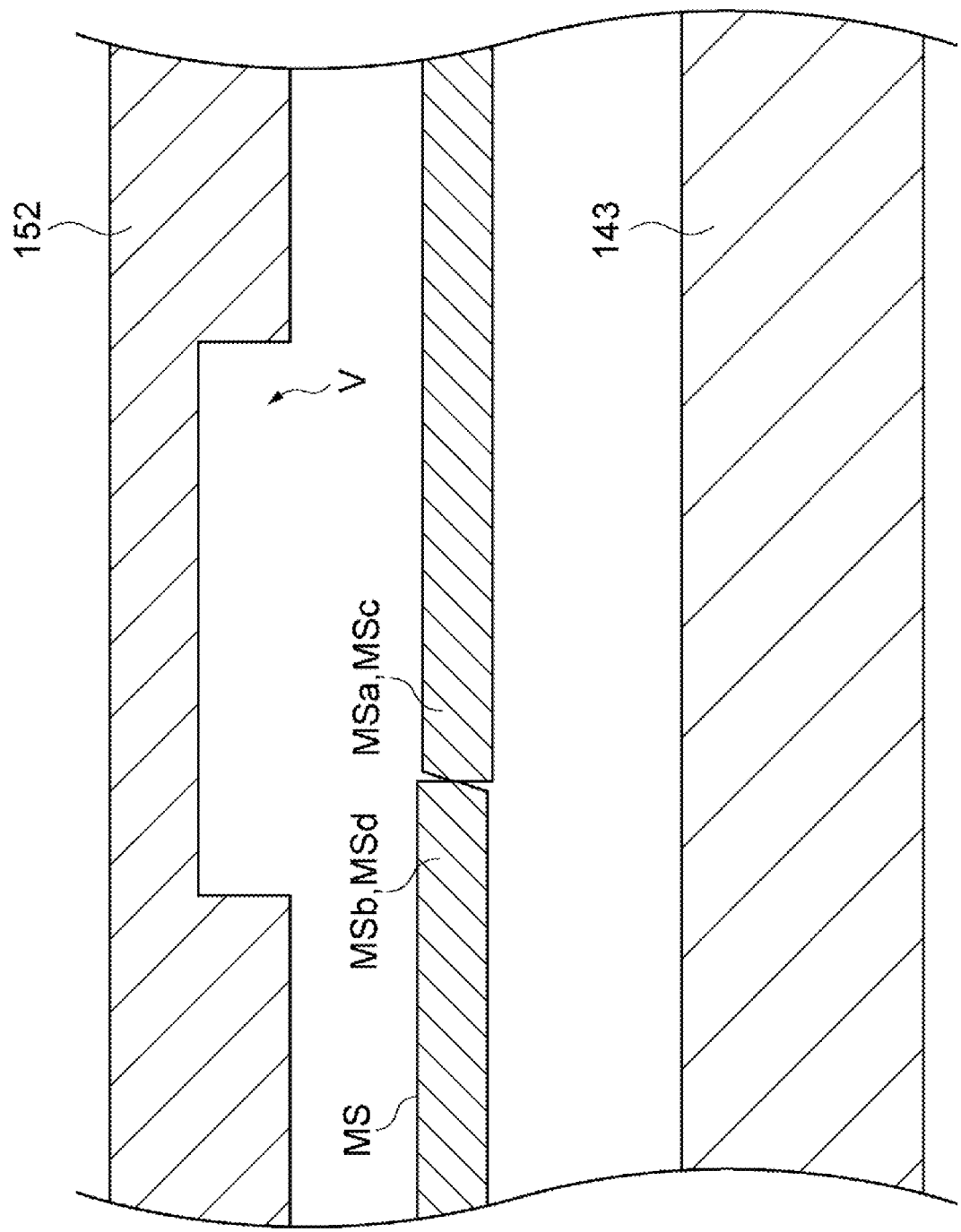
FIG. 17 is a cross-sectional view illustrating an example of a relationship between a part of a metal plate that is incompletely pushed back, and a die and a stripper.

By the way, as illustrated in FIG. 17, the stripper 152 may have a plurality of opening portions V formed therein. The opening portion V may be a through hole or a non-through recess portion. Since the opening portion V is provided, the die plate 143 and the stripper 152 do not pinch a part of the metal plate MS that has undergone incomplete pushback processing in the second punching unit. The cut and bent pieces MSa and MSc are prevented from being completely press-fitted into the base material portions MSb and MSd, respectively. On a downstream side of the second punching unit and an upstream side of the fifth punching unit, a plurality of opening portions V may be provided to cover partial press-fit portions of the cut and bent piece MSa (MSc) and the base material portion MSb (MSd) when the metal plate MS is pinched between the die plate 143 and the stripper 152. When the metal plate MS is pinched between the die plate 143 and the stripper 152, the relevant portion is positioned within the opening portion V. The plurality of opening portions V may be formed in the die plate 143 or may be formed in both the die plate 143 and the stripper 152.

[Method for Manufacturing Laminated Stator Iron Core]

Figure 20:
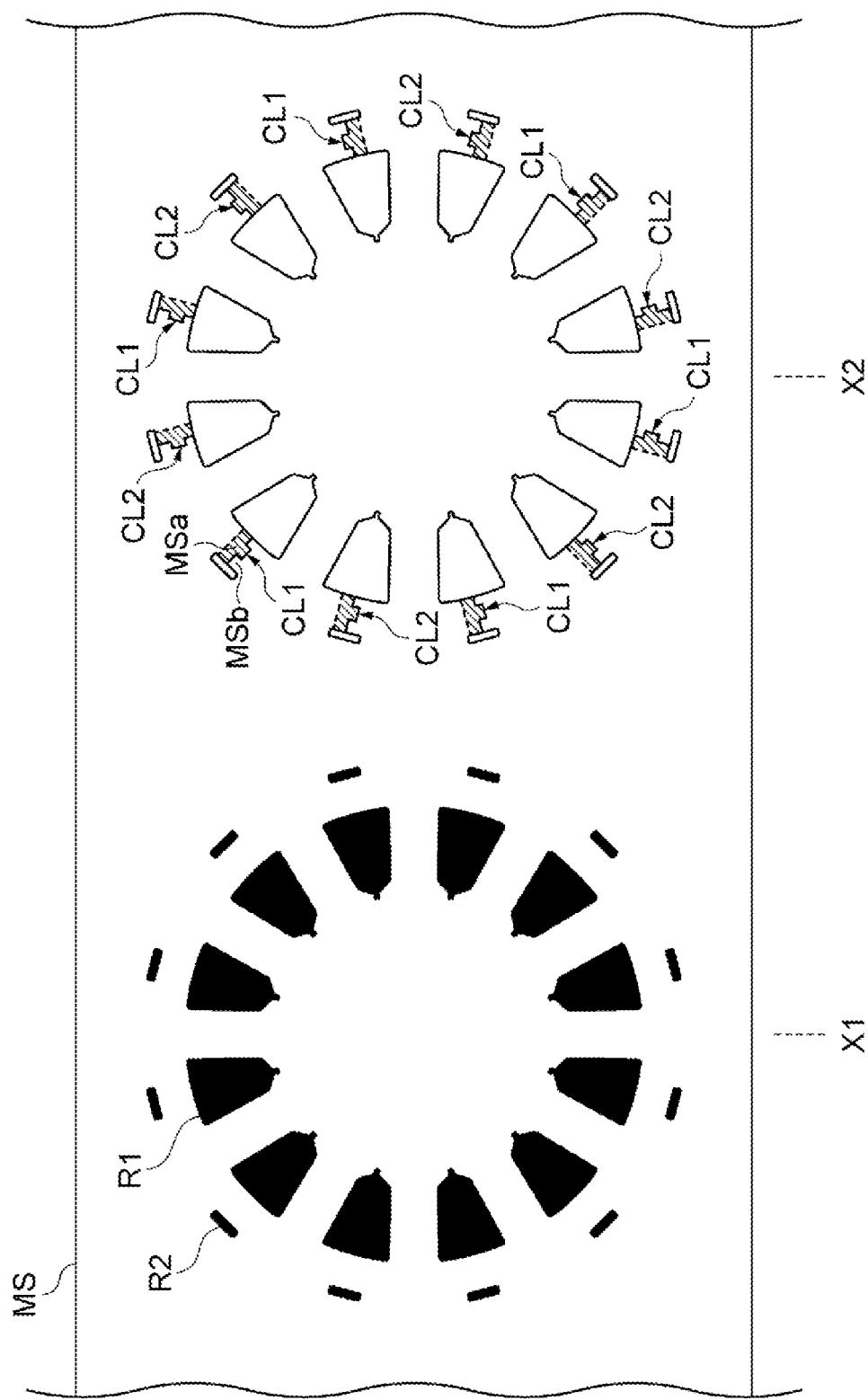
FIG. 20 is a diagram partially illustrating an example of a layout for press working of a metal plate.
Figure 21:
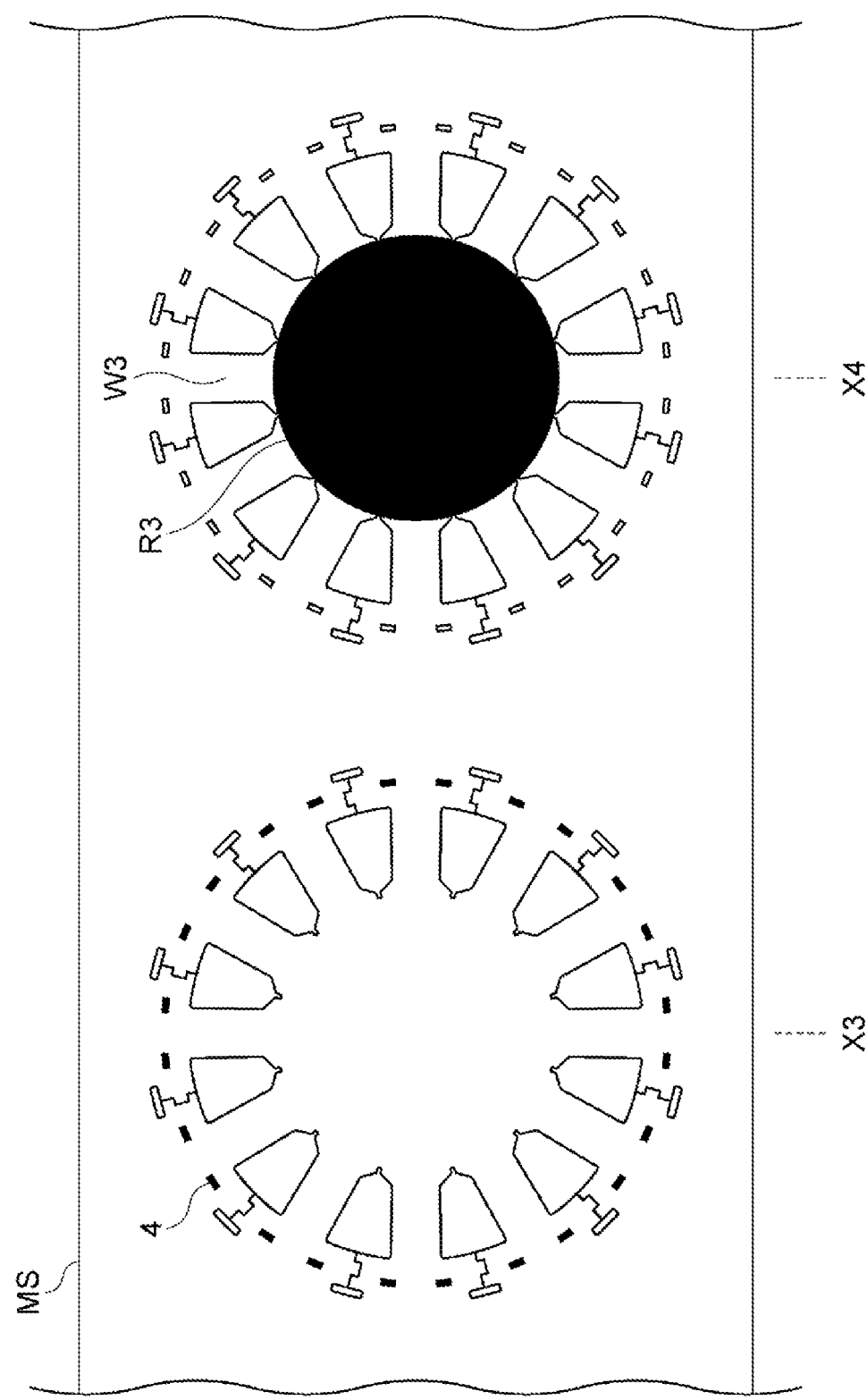
FIG. 21 is a diagram illustrating a portion subsequent to FIG. 20 in the layout for press working of the metal plate.
Figure 22:
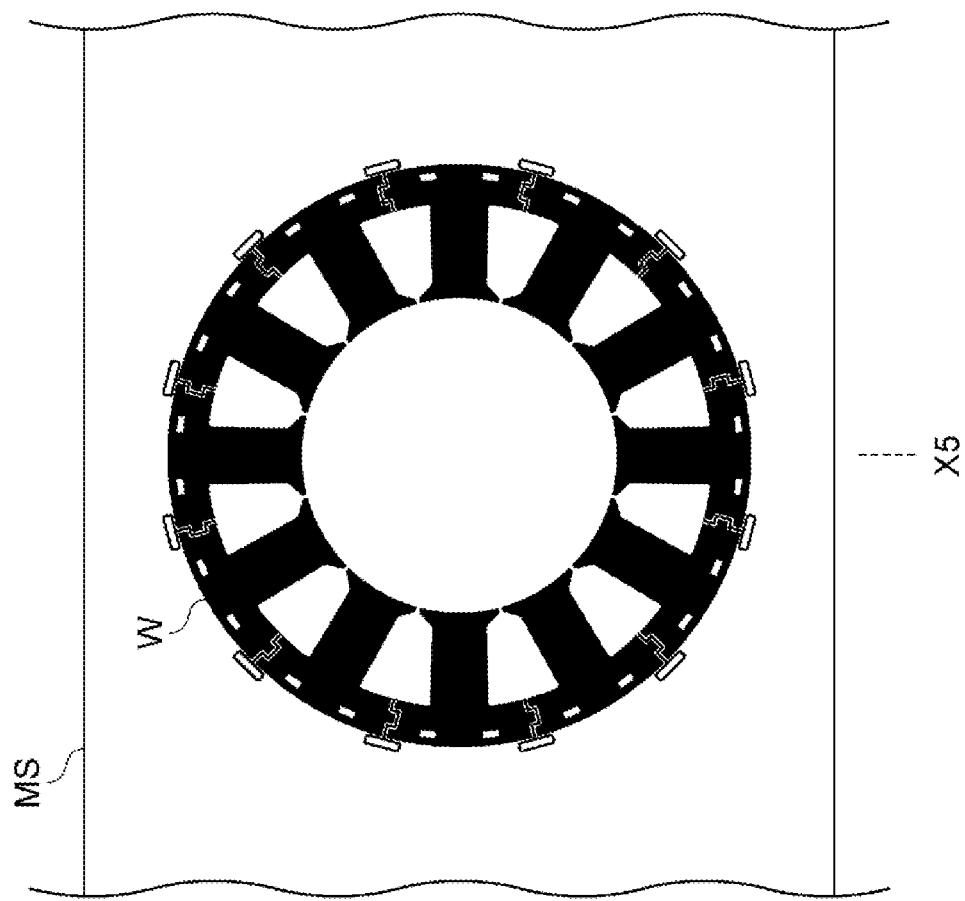
FIG. 22 is a diagram illustrating a portion subsequent to FIG. 21 in the layout for press working of the metal plate.

Next, a method for manufacturing the laminated stator iron core 1 will be described with reference to FIGS. 20 to 22.

When the metal plate MS is intermittently delivered to the pressing device 130 by the delivery device 120 and a predetermined portion of the metal plate MS reaches the first processing unit, the press 160 operates to push the upper die 150 downward toward the lower die 140. After the stripper 152 reaches the metal plate MS and the metal plate MS is pinched between the stripper 152 and the die plate 143, the press 160 pushes the upper die 150 downward.

Here, the stripper 152 does not move, but the punch holder 151 and the punches P1 to P5 continue to descend. Therefore, a tip portion of the punch P1 moves downward in each through hole of the stripper 152 and reaches a vicinity of the die hole D1a of the die D1. In the process, the punch P1 punches the metal plate MS along the die hole D1a of the die D1. Thereby, a plurality of through holes R1 and a plurality of through holes R2 are formed in the metal plate MS (see position X1 in FIG. 20).

The plurality of through holes R1 have a shape corresponding to the slot W5 of the punched member W, and are arranged radially as a whole. The plurality of through holes R2 have rectangular shapes and are arranged radially as a whole. The through hole R2 is positioned radially outward of the through hole R1. Punched waste materials are discharged from the discharge hole C1. Then, the press 160 is operated to raise the upper die 150.

Next, when the metal plate MS is intermittently delivered by the delivery device 120 and a predetermined portion of the metal plate MS reaches the second processing unit, similar to the above, the upper die 150 is vertically moved by the press 160, and the punch P2 and the die D2 perform cutting, bending, and incomplete pushback processing of the metal plate MS. As a result, the cutting lines CL1 and CL2 are formed between the through hole R1 and the through hole R2 (see position X2 in FIG. 20).

Next, when the metal plate MS is intermittently delivered by the delivery device 120 and a predetermined portion of the metal plate MS reaches the third processing unit, similar to the above, the upper die 150 is vertically moved by the press 160, and punching or half-punching of the metal plate MS is performed by the punch P3 and the die D3. As a result, a plurality of crimped portions 4 are formed at predetermined locations on the metal plate MS (see position X3 in FIG. 21). Punched waste materials are discharged from the discharge hole C3.

Next, when the metal plate MS is intermittently delivered by the delivery device 120 and a predetermined portion of the metal plate MS reaches the fourth processing unit, similar to the above, the upper die 150 is vertically moved by the press 160, and the metal plate MS is punched by the punch P4 and the die D4. Thereby, the through hole R3 having a circular shape is formed (see position X4 in FIG. 21). Punched waste materials are discharged from the discharge hole C4.

The through hole R3 has a shape corresponding to the through hole Wa of the punched member W, and partially overlaps with the inside of the plurality of through holes R1. A plurality of tooth pieces W3 are formed by communicating the through hole R3 with the through hole R1.

Next, when the metal plate MS is intermittently delivered by the delivery device 120 and a predetermined portion of the metal plate MS reaches the fifth processing unit, similar to the above, the upper die 150 is vertically moved by the press 160, and the metal plate MS is punched by the punch P5 and the die D5. The punched member W (see position X5 in FIG. 22) is formed.

The punched members W that are punched are held by the crimped portions 4 while being laminated in the die hole D5a with respect to the previously punched punched member W. Here, before the metal plate MS is punched by the punch P5 to rotationally laminate the punched member W, the controller Ctr may instruct the drive mechanism 172 to rotate the die D5 by a predetermined angle together with the punched member W in the die hole D5a. When rotationally laminating the punched members W in each of which six cutting lines CL1 and six cutting lines CL2 are provided and the cutting lines CL1 and CL2 are alternately aligned in the circumferential direction, the angle of rotational laminating may be, for example, 30°, 60°, or 90°. When the angle of rotational laminating is 30° or 90°, the cutting line CL1 and the cutting line CL2 appear alternately in the laminating direction for any cutting line group G of the laminated stator iron core 1. When the angle of rotational laminating is 60°, in a single cutting line group G of the fixed laminated iron core 1, either the cutting line CL1 or the cutting line CL2 appears in the laminating direction.

Figure 18:
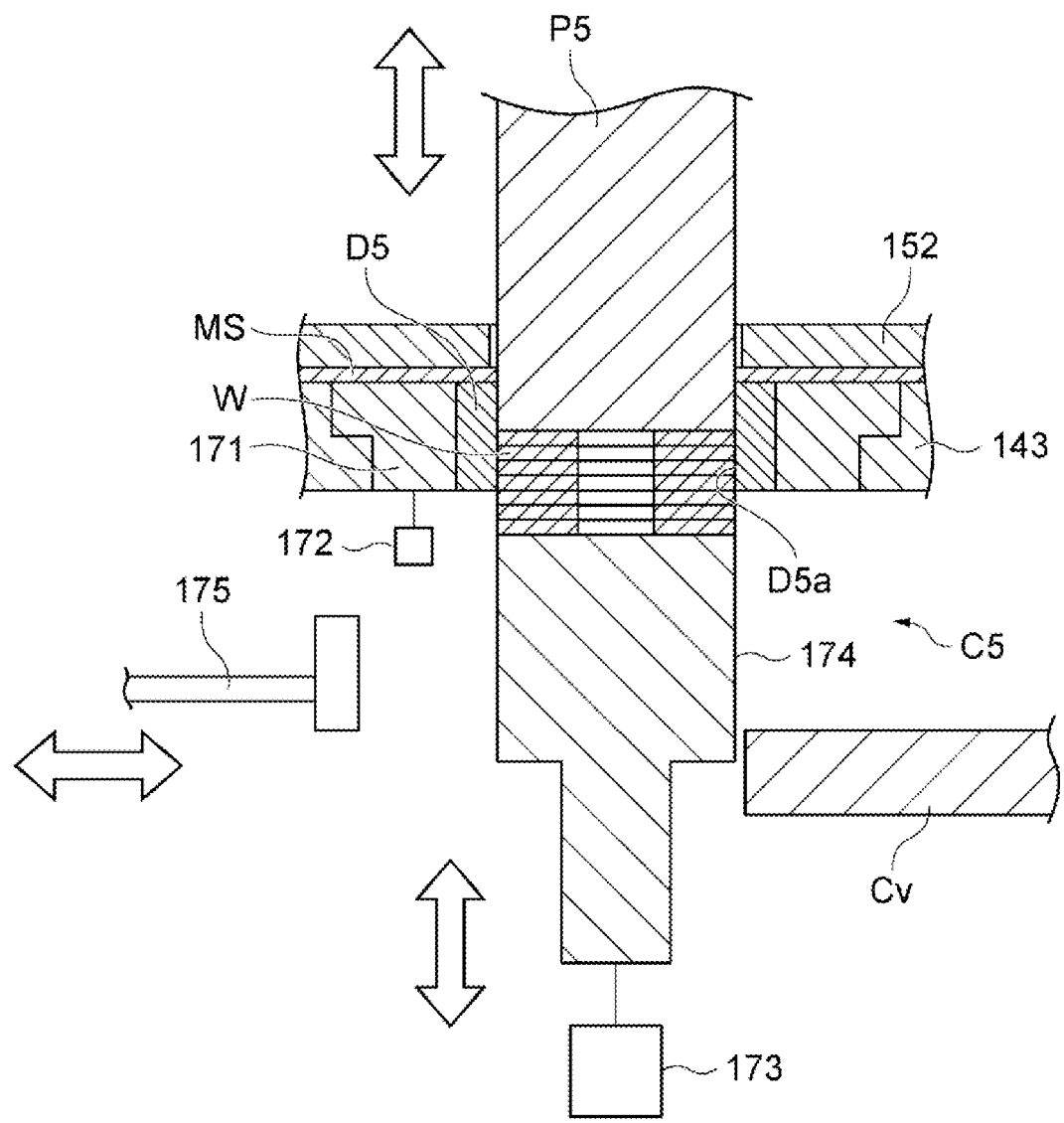
FIG. 18 is a cross-sectional view illustrating an example of a processing unit that forms a punched member, and is a diagram for illustrating how a metal plate material is punched out from a metal plate and rotationally laminated.
Figure 19:
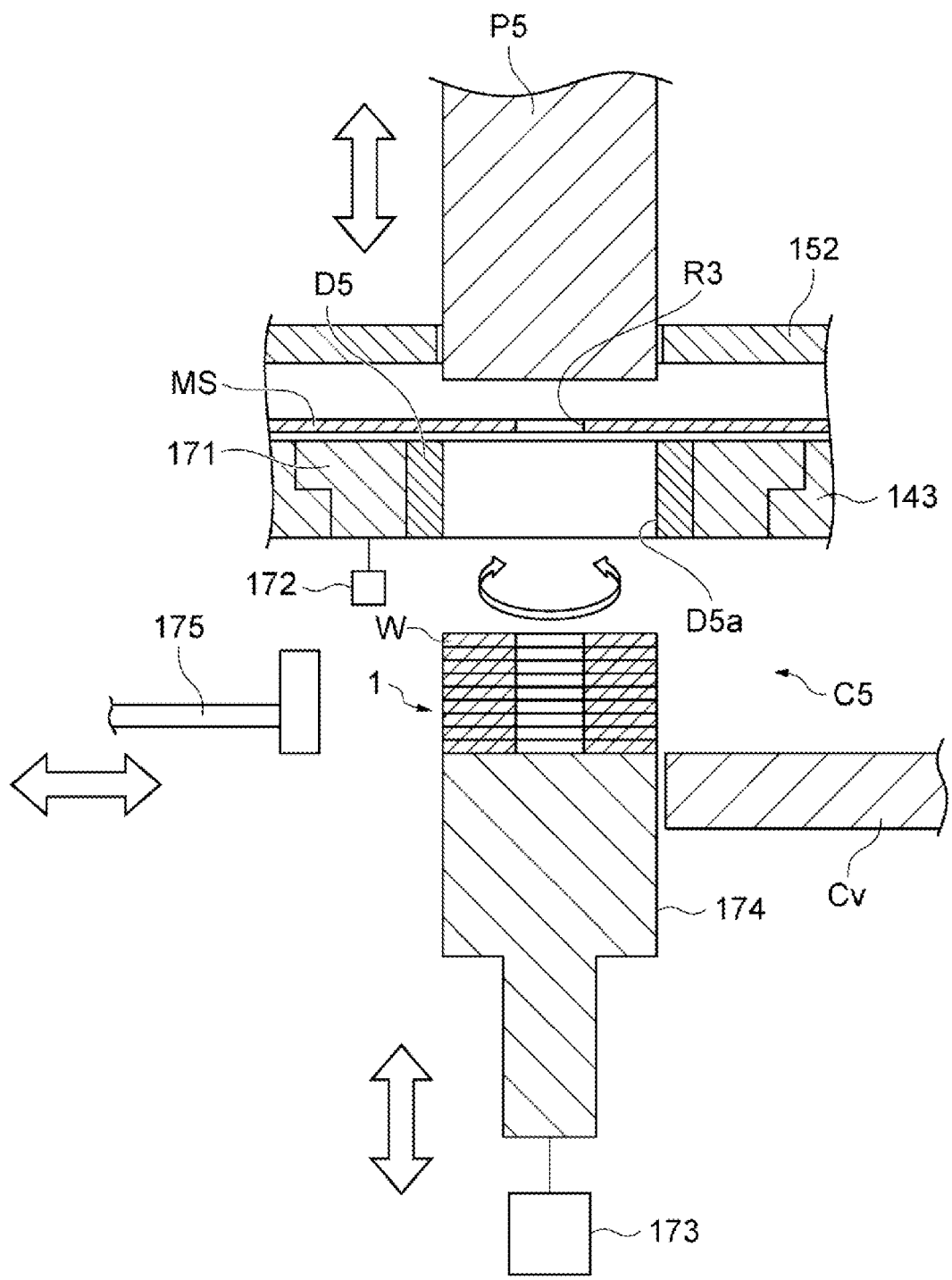
FIG. 19 is a diagram for illustrating how a laminated stator iron core is ejected from a press machine in the processing unit of FIG. 18.

When a predetermined number of punched members W are laminated in the die hole D5a, the laminated stator iron core 1 is formed (see FIG. 18). The laminated stator iron core 1 is pushed by the pusher 175 to the conveyor Cv and conveyed to the annealing furnace 200. After that, when the laminated stator iron core 1 is heat-treated in the annealing furnace 200, strain is removed from the punched member W, and the laminated stator iron core 1 is completed.

[Operation]

According to the above example, the shear surface SA formed on the end surface S1a and the shear surface SA formed on the end surface S1b abut on each other, and a yoke piece W2a and another yoke piece W2a are temporarily connected via the cutting line CL1 defined by a boundary between the end surface S1a and the end surface S1b so that the end surfaces S1a and S1b do not completely overlap each other. The shear surface SA formed on the end surface S2a and the shear surface SA formed on the end surface S2b abut on each other, and a yoke piece W2a and another yoke piece W2a are temporarily connected to each other via the cutting line CL1 defined by a boundary between the end surface S2a and the end surface S2b so that the end surfaces S2a and S2b do not completely overlap each other. In other words, a step is formed between one yoke piece W2a and another yoke piece W2a adjacent to each other. Here, compared to the split-type laminated iron core of Patent Literature 1, an abutment area of the adjacent yoke pieces W2a on the shear surfaces SA of the end surfaces S2a and S2b is smaller. As a result, a holding force between the adjacent one yoke piece W2a and the other yoke piece W2a is reduced. Therefore, the iron core pieces 6 can be separated with a smaller force.

According to the above example, the size of the step can be set to 10% to 40% of the plate thickness of the punched member W. Here, the shape of the laminated stator iron core 1 tends to be maintained unless an external force is actively applied to the laminated stator iron core 1 to separate the iron core pieces 6. Therefore, it is possible to prevent the iron core pieces 6 from being unintentionally separated into individual pieces while reducing the holding force between the iron core pieces 6.

According to the above example, the end surfaces S1a and S1b are substantially composed of the shear surfaces SA. The fracture surfaces SB formed on the end surfaces S2a and S2b are relatively uneven, while the shear surfaces SA are relatively smooth. Therefore, the holding force between the iron core pieces 6 on the end surfaces S1a and S1b is relatively small. Therefore, the iron core pieces 6 can be separated with a smaller force.

According to the above example, the opening portion V can be formed on at least one of the die plate 143 and the stripper 152. When the punch holder 151 reaches the bottom dead center (when the metal plate MS is pinched by the die plate 143 and the stripper 152), a part where the metal plate MS is incompletely pushed back in the second punching unit can be arranged in the opening portion V. Here, when the metal plate MS is processed, an area of the metal plate MS excluding the vicinity of the part is pinched between the die plate 143 and the stripper 152. Therefore, it is possible to form an incomplete press-fit state of the cut and bent pieces MSa and MSc into the base material portions MSb and MSd while preventing the displacement of the metal plate MS during processing of the metal plate MS. As a result, the split-type laminated iron core 1 in which one yoke piece W2a and the other yoke piece W2a adjacent to each other are partially temporarily connected via the cutting lines CL1 and CL2 can be produced.

According to the above example, one long side Qa of the punch P2A and the outline Qb of the protruding portion may be positioned outside one long side Ea of the die hole D2a of the die D2A and the outline Eb of the protruding portion. That is, when viewed from above, a part of the punch P2A that is the part forming one long side Qa and the outline Qb of the protruding portion forms an overlapping portion overlapping a part of the die hole D2a of the die D2A that is the part forming one long side Ea and the outline Eb of the protruding portion. Therefore, when the cut and bent piece MSa and the base material portion MSb are formed by cutting and bending, of the end surfaces of the cut and bent piece MSa and the base material portion MSb, portions corresponding to the overlapping portion are substantially the shear surfaces SA. Since the shear surface SA is smoother than the fracture surface SB, the holding force between the portions tends to be small. Therefore, it is possible to separate the punched member W on the cutting line CL1 with a smaller force.

According to the above example, the plurality of punched members W are laminated so that the cutting lines CL1 and CL2 overlap each other. Here, the laminated stator iron core 1 is configured to include the cutting line group G in which the cutting lines CL1 having a relatively small holding force and the cutting lines CL2 having a relatively large holding force are arranged in a row in the laminating direction. Therefore, by adjusting the number of overlapping cutting lines CL1 and CL2, the holding force in the cutting line group G is changed. Therefore, it becomes possible to control a force required to separate the laminated stator iron core 1 at the cutting line group G.

According to the above example, the laminated stator iron core 1 can be heat-treated in the annealing furnace 200 after the laminated stator iron core 1 is formed by laminating the plurality of punched members W. Due to thermal expansion of the punched member W during annealing, a fastening force between the end surfaces of the adjacent yoke pieces W2a may increase. However, as described above, of the end surfaces of the cut and bent piece MSa and the base material portion MSb, the fastening force at a portion subjected to incomplete pushback processing or a portion corresponding to the overlapping portion is small. Therefore, even after annealing, the punched member W can be separated at the cutting line CL1 with a smaller force.

According to the above example, a plurality of punched members W can be rotationally laminated to form the laminated stator iron core 1. Here, a plurality of types of cutting lines CL1 and CL2 having different fastening forces are provided on one punched member W, and by appropriately rotationally laminating the punched members W, the types of cutting lines CL1 and CL2 that overlap in the laminating direction can be adjusted. Therefore, it is possible to adjust the force required to separate the laminated stator iron core 1 in the cutting line group G without increasing the types of punched members W.

Modification Example

The disclosure herein should be considered illustrative and not restrictive in all respects. Various omissions, substitutions, modifications, and the like may be made to the above example without departing from the scope and spirit of the claims.

(1) In the above example, one yoke piece W2a and another yoke piece W2a adjacent to each other are partially temporarily connected via the cutting lines CL1 and CL2 by incomplete pushback processing. However, adjacent yoke pieces W2a may be completely pushed back in either the cutting line CL1 or the cutting line CL2. In other words, there may be no step between the adjacent yoke pieces W2a on any of the cutting lines CL1 and CL2. In this case, the number of opening portions V formed on the die plate 143 or the stripper 152 may be reduced accordingly.

(2) The end surfaces S1a and S1b may each include an area defined by the shear surface SA and the fracture surface SB and an area substantially defined by the shear surface SA. Here, at least part of the outer shape of the punch that is the part corresponds to the cutting line may be located outside the outline of the die hole.

(3) At least one cutting line may be formed by the die and punch with the reverse clearance H1. All cutting lines may be formed by the die and punch with the reverse clearance H1. Here, the reverse clearance H1 may exist in part of the die and punch, or the reverse clearance H1 may exist in the entire die and punch.

(4) At least one cutting line may be formed by the die and punch with the normal clearance H2. All cutting lines may be formed by the die and punch with the normal clearance H2.

(5) At least one cutting line may be formed by the die and punch with a clearance of approximately 0 mm. All cutting lines may be formed by the die and punch with the clearance of approximately 0 mm.

(6) A plurality of cutting lines aligned in the laminating direction may not all overlap in the laminating direction.

(7) In the above example, the cutting line had a concavo-convex shape when viewed from above. However, when the cutting line includes a line segment extending along the radial direction of the yoke material W2 and a line segment extending along the circumferential direction of the yoke material W2, other shapes such as a crank shape and a stepped shape may be presented. Each line segment may have various shapes such as a straight line, a curved line, and an arc. For example, in FIG. 4, at least one corner portion may be cut linearly (for example, the corner portion may have a trapezoidal shape), or at least one corner portion may be cut in an arc (for example, the corner portion may have a circular arc shape).

(8) In the above example, although the inner rotor type laminated stator iron core 1 in which the rotor is arranged inside is described, the present technology may also be applied to an outer rotor type laminated stator iron core in which the rotor is arranged outside.

(9) Such technology may be applied not only to the laminated stator iron core 1 but also to a rotor laminated iron core.

The present disclosure appropriately incorporates the content disclosed in the Japanese patent application (Japanese Patent Application No. 2020-178692) filed on Oct. 26, 2020.

REFERENCE SIGNS LIST

1: laminated stator iron core (split-type laminated iron core, laminated body)
2: yoke
100: manufacturing apparatus for laminated stator iron core
130: pressing device
143: die plate (pinching member)
152: stripper (pinching member)
200: annealing furnace
CL1: cutting line (cutting line, another cutting line)
CL2: cutting line (another cutting line)
Ctr: controller (control unit)
D2: die
D2a: die hole (die hole, another die hole)
D2A: die
D2B: die (another die)
G: cutting line group
MS: metal plate
MSa: cut and bent piece
MSb: base material portion
MSc: cut and bent piece (another cut and bent piece)
P2A: punch
P2B: punch (another punch)
S1a: end surface (first end surface)
S1b: end surface (second end surface)
SA: shear surface
SB: fracture surface
U1, U2: unit
V: opening portion
W: punched member (metal plate material, another metal plate material)
W2: yoke material
W2a: yoke piece (first split piece, second split piece)

The invention claimed is:

1. A split-type laminated iron core, comprising:
a plurality of laminated metal plate materials having an annular shape,
wherein each metal plate material includes a first split piece and a second split piece arranged in a circumferential direction and divided by a predetermined cutting line, and
wherein a shear surface formed on a first end surface of the first split piece and a shear surface formed on a second end surface of the second split piece abut on each other, and the first split piece and the second split piece are temporarily connected via the cutting line defined by a boundary between the first end surface and the second end surface so that the first end surface and the second end surface of the metal plate material do not completely overlap.

2. The split-type laminated iron core according to claim 1, wherein a step is formed between an end portion of the first split piece and an end portion of the second split piece.

3. The split-type laminated iron core according to claim 2, wherein
a size of the step is 10% to 40% of a plate thickness of the metal plate material.

4. The split-type laminated iron core according to claim 1, wherein each of the first end surface and the second end surface includes an area that is substantially entirely a shear surface.

5. A method for manufacturing a split-type laminated iron core, comprising:
- forming a cut and bent piece including a first end surface and a base material portion including a second end surface corresponding to the first end surface by cutting and bending a predetermined part of a metal plate along a predetermined cutting line;
- making a shear surface formed on the first end surface and a shear surface formed on the second end surface abut on each other by partially pushing back the cut and bent piece against the base material portion and temporarily connecting the cut and bent piece and the base material portion via the cutting line defined by a boundary between the first end surface and the second end surface so that the first end surface and the second end surface do not completely overlap;
- punching the metal plate to include the predetermined part without completely press-fitting the cut and bent piece into the base material portion to form a plurality of metal plate materials having an annular shape; and
- forming a laminated body by laminating the plurality of metal plate materials.

6. The method for manufacturing the split-type laminated iron core according to claim 5, wherein pushing back includes temporarily connecting the cut and bent piece and the base material portion to form a step between the cut and bent piece and the base material portion.

7. The method for manufacturing the split-type laminated iron core according to claim 6, further comprising:
- annealing the laminated body after forming the laminated body.

8. The method for manufacturing the split-type laminated iron core according to claim 5, wherein
- an opening portion is formed in at least one of a pair of pinching members configured to pinch the metal plate during each processing of the metal plate, and
- when the metal plate is pinched by the pair of pinching members, the cut and bent piece and the base material portion that are temporarily connected are arranged in the opening portion.

9. The method for manufacturing the split-type laminated iron core according to claim 5, wherein
- cutting and bending includes pushing the metal plate partially into a die hole with a punch by advancing the punch toward the die hole provided in a die, and
- at least a part of an outer shape of the punch that is the part corresponds to the cutting line is located outside an outline of the die hole when viewed from an advancing direction of the punch.

* * * * *